United States Patent
Myung et al.

(10) Patent No.: US 9,184,966 B2
(45) Date of Patent: Nov. 10, 2015

(54) TRANSMITTING APPARATUS, METHOD OF MAPPING DATA THEREOF, RECEIVING APPARATUS, DATA PROCESSING METHOD THEREOF

(71) Applicant: SAMSUNG ELECTRONICS CO., LTD., Suwon-si (KR)

(72) Inventors: Se-ho Myung, Yongin-si (KR); Hong-sil Jeong, Suwon-si (KR); Kyung-joong Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/484,937

(22) Filed: Sep. 12, 2014

(65) Prior Publication Data

US 2015/0071376 A1    Mar. 12, 2015

Related U.S. Application Data

(60) Provisional application No. 61/876,973, filed on Sep. 12, 2013.

(30) Foreign Application Priority Data

Sep. 12, 2014    (KR) .................. 10-2014-0121189

(51) Int. Cl.
    *H04L 27/26* (2006.01)
(52) U.S. Cl.
    CPC .................. *H04L 27/2602* (2013.01)
(58) Field of Classification Search
    CPC .............. H04L 27/2602; H04L 1/0071; H04L 27/2626; H04L 27/34; H04L 5/0007; H04L 27/2647; H04L 5/0044; H04L 5/0053; H04L 5/0064; H04L 1/0041; H04L 5/0023; H04L 1/0009; H04L 1/0026; H04L 1/0027
    See application file for complete search history.

(56) References Cited

U.S. PATENT DOCUMENTS

| | | | |
|---|---|---|---|
| 8,842,223 B2 * | 9/2014 | Takahashi et al. | 348/723 |
| 8,861,628 B2 * | 10/2014 | Roh et al. | 375/267 |
| 2010/0085985 A1 * | 4/2010 | Pekonen et al. | 370/474 |
| 2011/0002286 A1 | 1/2011 | Jeon et al. | |
| 2011/0205987 A1 | 8/2011 | Teague et al. | |
| 2011/0299628 A1 * | 12/2011 | Ko et al. | 375/298 |

(Continued)

FOREIGN PATENT DOCUMENTS

WO    2010104247 A1    9/2010

OTHER PUBLICATIONS

Search Report issued on Dec. 19, 2014 by the International Searching Authority in related application No. PCT/KR2014/008539.
Written Opinion issued on Dec. 19, 2014 by the International Searching Authority in related application No. PCT/KR2014/008539.

*Primary Examiner* — Hirdepal Singh
(74) *Attorney, Agent, or Firm* — Sughrue Mion, PLLC

(57) ABSTRACT

A method of processing data of an Orthogonal Frequency Division Multiplexing (OFDM) symbol, a transmitter and a receiver processing the OFDM symbol are provided. The method performed by the transmitter includes: mapping first data and second data to an OFDM symbol and transmitting a frame including the OFDM symbol. The mapping includes additionally mapping at least a portion of the second data to cells of the OFDM symbol which remain after the first data and the second data are mapped to the OFDM symbol.

23 Claims, 23 Drawing Sheets

(56) References Cited

U.S. PATENT DOCUMENTS

| | | | |
|---|---|---|---|
| 2012/0188954 A1* | 7/2012 | Mourad et al. | 370/329 |
| 2012/0288029 A1* | 11/2012 | Ouchi et al. | 375/296 |
| 2013/0136099 A1 | 5/2013 | Kwon et al. | |
| 2013/0219431 A1 | 8/2013 | Hong et al. | |
| 2014/0337690 A1* | 11/2014 | Zhang | 714/776 |
| 2015/0010103 A1* | 1/2015 | Murakami et al. | 375/267 |

* cited by examiner

TRANSMITTING APPARATUS, METHOD OF MAPPING DATA THEREOF, RECEIVING APPARATUS, DATA PROCESSING METHOD THEREOF

CROSS-REFERENCE TO RELATED APPLICATIONS

This application claims priority from U.S. Provisional Application No. 61/876,973 filed on Sep. 12, 2013 in the United States Patent and Trademark Office and Korean Patent Application No. 10-2014-0121189 field on Sep. 12, 2014, in the Korean Intellectual Property Office, the disclosures of which are incorporated herein in their entirety by reference.

BACKGROUND

1. Field

Apparatuses and methods consistent with exemplary embodiments relate to a transmitting apparatus, a method of mapping data thereof, a receiving apparatus, and a data processing method thereof, and more particularly, to a transmitting apparatus which maps data to an Orthogonal Frequency Division Multiplexing (OFDM) symbol, a method of mapping data thereof, a receiving apparatus, and a data processing method thereof.

2. Description of the Related Art

In the 21st century's information-oriented society, a broadcasting communication service has been developed so as to provide digitized services with multi-channels, broadband, and high quality. In particular, with the popularization of a high-definition digital television (TV), a portable multimedia player (PMP), and a portable broadcasting device, there is an increasing demand for a digital broadcasting service which supports various receiving methods.

In response to such demand, a standard group enacted various standards and provides various services for satisfying user needs. One of these standards is the digital video broadcasting the second generation European terrestrial (DVB-T2). Still, however, there is a demand for providing a user with enhanced services with more excellent transmission and reception performance.

SUMMARY

One or more exemplary embodiments may address the aforementioned and other problems and disadvantages occurring in the related art by providing a transmitting apparatus, a receiving apparatus, and a data processing method thereof which additionally maps data to cells of an OFDM symbol, transmits the mapped data, and receives and processes the data.

According to an aspect of an exemplary embodiment, there is provided a method of processing data which may include: mapping first data and second data to an OFDM symbol and transmitting a frame including the OFDM symbol. In addition, the mapping may be performed by additionally mapping at least a portion of the second data to cells of the OFDM symbol which remain after the first data and the second data are mapped to the OFDM symbol.

The second data may include a plurality of second data blocks.

The mapping may include: mapping the first data and the second data blocks to the OFDM symbol; calculating a length of the at least a portion of each of the second data blocks which is to be additionally mapped based on a number of the remaining cells and a number of the second data blocks; and additionally mapping the at least a portion of each of the second data blocks to the remaining cells, based on the calculated length.

The mapping may include: mapping the first data and a block of the second data blocks to cells of the OFDM symbol; and additionally mapping at least a portion of the block to cells from a cell next to a last cell to which the block is mapped.

The mapping may further include: mapping another block among the second data blocks to cells from a cell next to a last cell to which the at least a portion of the block is mapped; and additionally mapping at least a portion of the other block to cells from a cell next to a last cell to which the other block is mapped.

According to an aspect of another exemplary embodiment, there is provided a transmitting apparatus which may include: a frame mapper configured to map first data and second data to an OFDM symbol and a transmitter configured to transmit a frame including the OFDM symbol. In addition, the frame mapper may additionally map at least a portion of the second data to cells which remain after the first data and the second data are mapped to the OFDM symbol.

The second data may include a plurality of second data blocks.

The frame mapper may map the first data and the second data blocks to the OFDM symbol, calculate a length of the at least a portion of each of the second data blocks which is to be additionally mapped based on a number of the remaining cells and a number of the second data blocks, and additionally map the at least a portion of each of the second data blocks to the remaining cells, based on the calculated length.

The frame mapper may map the first data and a block among the second data blocks to cells of the OFDM symbol, and additionally map at least a portion of the block to cells from a cell next to a last cell to which the block is mapped.

The frame mapper may map another block among the second data blocks to cells from a cell next to a last cell to which the at least a portion of the block is mapped, and additionally map at least a portion of the other block to cells from a cell next to a last cell to which the other block is mapped.

According to an aspect of still another exemplary embodiment, there is provided a data processing method of a receiving apparatus which may include: receiving a signal from a transmitting apparatus; and processing the received signal to restore first data and second data included in the signal, wherein the processing comprises determining that at least a portion of the second data is additionally mapped to cells of an Orthogonal Frequency Division Multiplexing (OFDM) symbol which remain after the first data and the second data are mapped to the OFDM symbol.

The second data may include a plurality of second data blocks.

The processing may further include determining that the first data and the plurality of second data blocks are mapped to cells of the OFDM symbol, and the at least a portion of each of the second data blocks is additionally mapped to the remaining cells, based on a length of the additionally mapped portion of each of the second data blocks which is calculated based on a number of the remaining cells and a number of the second data blocks.

The processing may further include determining that the first data and a block among the second data blocks are mapped to cells of the OFDM symbol, and at least a portion of the block is additionally mapped to cells from a cell next to a last cell to which the block is mapped.

The processing may further include determining that another block among the second data blocks is mapped to cells from a cell next to a last cell to which the at least a portion of the block is mapped, and at least a portion of the other block is additionally mapped to cells from a cell next to a last cell to which the other block is mapped.

According to an aspect of still another exemplary embodiment, there is provided a receiving apparatus which receives a signal from a transmitting apparatus and processes the received signal. The receiving apparatus may be configured to restore first data and second data included in the signal by determining that at least a portion of the second data is additionally mapped to cells of an OFDM) symbol which remain after the first data and the second data are mapped to the OFDM symbol.

The second data may include a plurality of second data blocks.

The receiving apparatus may further determine that the first data and the plurality of second data blocks are mapped to cells of the OFDM symbol, and the at least a portion of each of the second data blocks is additionally mapped to the remaining cells, based on a length of the additionally mapped portion of each of the second data blocks which is calculated based on a number of the remaining cells and a number of the second data blocks.

The receiving apparatus may further determine that the first data and a block among the second data blocks are mapped to cells of the OFDM symbol, and at least a portion of the block is additionally mapped to cells from a cell next to a last cell to which the block is mapped.

The receiving apparatus may further determine that another block among the second data blocks is mapped to cells from a cell next to a last cell to which the at least a portion of the block is mapped, and at least a portion of the other block is additionally mapped to cells from a cell next to a last cell to which the other block is mapped.

According to the above various exemplary embodiments, the second data may be additionally mapped to the remaining cells of an OFDM symbol. Thus, as the second data is additionally mapped, reliability of a receiving party which receives and processes the second data such as L1-post signaling may be enhanced.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION OF THE EXEMPLARY EMBODIMENTS

Figure 1:
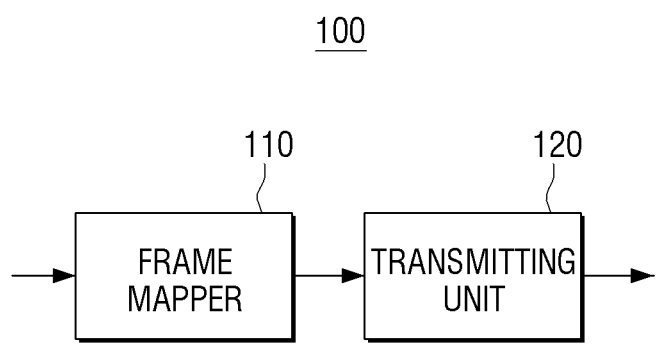
FIG. 1 is a block diagram provided to describe a structure of a transmitting apparatus according to an exemplary embodiment.

Hereinafter, exemplary embodiments will be described in greater detail with reference to the accompanying drawings. In the following description, same reference numerals are used for the same components when they are depicted in different drawings. The matters defined in the description, such as detailed construction and components, are provided to assist in a comprehensive understanding of the exemplary embodiments. Thus, it is apparent that these exemplary embodiments can be carried out without those specifically defined matters. Also, functions or components known in the related art are not described in detail since they would obscure the exemplary embodiments with unnecessary detail. Many of the terms used in the exemplary embodiments may be consistent with those used in the DVB-T2.

FIG. 1 is a block diagram provided to describe a structure of a transmitting apparatus, according to an exemplary embodiment. According to FIG. 1, a transmitting apparatus 100 includes a frame mapper 110 and a transmitting unit 120.

The frame mapper 110 maps a first type of data (hereinafter referred to as "first data") and a second type of data (hereinafter referred to as "second data") to an Orthogonal Frequency Division Multiplexing (OFDM) symbol.

Here, the OFDM symbol may be a preamble symbol in a frame (e.g., an OFDM frame) which is formed of the preamble symbol and data symbols. As an example, a preamble symbol may be an 8k OFDM symbol having 8192 cells (or, sub-carriers).

The first data may include information required for a receiving apparatus 1500 (to be described later in reference to FIG. 15) to access the second data. The second data may include information required for the receiving apparatus 1500 to access data mapped to a data symbol in the frame. Various information on the first data, such as information on a length of the first data, a location of cells to which the first data is mapped in the OFDM symbol, etc., may be predefined between the transmitting apparatus 100 and the receiving apparatus 1500. Accordingly, the receiving apparatus 1500 may recover (or restore) the first data from the OFDM symbol based on this information, and recover the second data from the OFDM symbol by obtaining information on the second data from the first data. Here, the first data may comprises the information on the second data, and the information on the second data may comprise at least one of the information on the length of the second data and a location of cells to which the first data is mapped in the OFDM symbol, etc. Accordingly, the receiving apparatus 1500 may recover the second data from the OFDM symbol based on this information.

In addition, the receiving apparatus 1500 may obtain information, such as a transmission method of data mapped to the data symbol, a length, etc., based on the second data, and recover the data from the data symbol by using the obtained information.

Here, the first data and the second data may be an L1-pre signaling and an L1-post signaling which constitute a preamble symbol of a frame. In this case, the data mapped to the data symbol may be broadcasting data (for example, data representing actual broadcasting contents) formed of one or more Physical Layer Pipes (PLP).

The first data and the second data may be input into the frame mapper 110 in a form of a modulation symbol.

To be specific, bits constituting each of the first data and the second data may be modulated according to various modulation methods, such as Binary Phase Shift Keying (BPSK), Quadrature Phase Shift Keying (QPSK), 16-Quadrature Amplitude Modulation (QAM), 64-QAM, 256-QAM, 1024-QAM, 4096-QAM, etc., and input into the frame mapper 110. The frame mapper 110 may map each of modulation symbols to a cell in an OFDM symbol. In this case, a modulation method having non-uniform constellation may be applied, as well as a common QAM method.

In this case, the number of modulation symbols input into the frame mapper 110 may be determined as below.

When the number of bits constituting the first data is $N_{data\_1}$, the number of modulation symbols generated from the first data is the same as $N_{data\_1}/\eta_{MOD\_data\_1}$. Here, $\eta_{MOD\_data\_1}$ is a modulation order (or modulation degree) with respect to the first data, and in case the modulation method is BPSK, QPSK, 16-QAM, 64-QAM, 256-QAM, and 1024-QAM, $\eta_{MOD\_data\_1}$ may be 1, 2, 4, 6, 8, and 10, respectively.

The second data may be segmented into a plurality of segments such that each of the segmented second data may have a length shorter than a predetermined value, and each of the segmented second data may be mapped to an OFDM symbol. Accordingly, assuming that the second data is segmented into $N_{data\_block\_2}$ number of segments, and the number of bits constituting each of the segmented second data is $N_{data\_2}$, the number of modulation symbols generated from each of the segmented second data may be $N_{data\_2}/\eta_{MOD\_data\_2}$, and the number of modulation symbols generated from the entire second data may be $N_{data\_2}/\eta_{MOD\_data\_2} \times N_{data\_block\_2}$. Here, $\eta_{MOD\_data\_2}$ is a modulation order with respect to the second data, and in case the modulation method is BPSK, QPSK, 16-QAM, 64-QAM, 256-QAM, and 1024-QAM, $\eta_{MOD\_data\_2}$ may be 1, 2, 4, 6, 8, and 10, respectively.

Hereinafter, as an example of a case where the first data is an L1-pre signaling and the second data is an L1-post signaling, the number of modulation symbols input into the frame mapper 110 will be described in further detail.

The L1-pre signaling and the L1-post signaling may be encoded, modulated, and input into the frame mapper 110, respectively. The frame mapper 110 may map the modulation symbols to cells of a preamble symbol.

A bit string generated by encoding the L1-pre signaling is referred to as an L1-pre Forward Error Correction (FEC) frame. The number of modulation symbols of the L1-pre FEC frame is $N_{L1pre}/\eta_{MOD\_L1pre}$. Here, $N_{L1pre}$ refers to the number of bits constituting the L1-pre FEC frame, and $\eta_{MOD\_L1pre}$ refers to a modulation order with respect to the L1-pre signaling. When a modulation method is BPSK, QPSK, 16-QAM, 64-QAM, 256-QAM, and 1024-QAM, $\eta_{MOD\_L1pre}$ may be 1, 2, 4, 6, 8, and 10, respectively.

A length of the L1-post signaling is variable. Accordingly, the L1-post signaling may be segmented to a plurality of L1-post signalings so that each of the segmented L1-post signalings may have a length shorter than a predetermined value, and each of the segmented L1-post signaling may be encoded. That is, the L1-post signaling is segmented, and then, each of the segmented L1-post signalings is encoded. Accordingly, each of bit strings generated by encoding each of the segmented L1-post signalings may be referred to as an L1-post FEC frame.

In this case, the number of bits constituting each of the L1-post FEC frames is $N_{L1post}$, and each of the L1-post FEC frames may be mapped to $N_{MOD\_L1post\_per\_FEC}(=N_{L1post}/\eta_{MOD\_L1post})$ number of modulation symbols. Here, $\eta_{MOD\_L1post}$ refers to a modulation order with respect to a segmented L1-post signaling. When a modulation method is BPSK, QPSK, 16-QAM, 64-QAM, 256-QAM, and 1024-QAM, $\eta_{MOD\_L1post}$ may be 1, 2, 4, 6, 8, and 10, respectively.

Accordingly, when the number of the L1-post FEC frames is $N_{L1post\_FECFRAME}$, the number of the modulation symbols $N_{MOD\_L1post\_Total}$ with respect to the L1-post signaling is the same as $N_{MOD\_L1post\_Total} = N_{MOD\_L1post\_per\_FEC} \times N_{L1post\_FECFRAME}$.

Hereinafter, a method of mapping first data and second data to an OFDM symbol by the frame mapper 110 will be described in further details.

The frame mapper 110 maps the first data and the second data to cells of the OFDM symbol. To be specific, the frame mapper 110 may map the first data and the second data to a plurality of cells constituting the OFDM symbol in a sequential order.

For example, when indexes of the cells constituting the OFDM symbol is 0, 1, 2 . . . , the frame mapper 110 sequentially maps modulation symbols of the first data from $0^{th}$ cell to $(N_{data\_1}/\eta_{MOD\_data\_1}-1)^{th}$ cell. In addition, the frame mapper 110 may sequentially map modulation symbols of the second data from a cell next to a cell to which a modulation symbol of the L1-pre signaling is mapped lastly, that is, from $(N_{data\_1}/\eta_{MOD\_data\_1})^{th}$ cell.

The frame mapper 110 may perform an mapping operation for each data block. That is, the second data is segmented into a plurality of data blocks, and each of the segmented data blocks is mapped to the OFDM symbol. Assuming that each of the segmented data blocks is a second data block (i.e., a data block of the second data), the frame mapper 110 may map the second data to the OFDM symbol for each of the second data blocks.

For example, when three second data blocks are generated by segmenting the second data, the frame mapper 110 may sequentially map modulation symbols with respect to a first second data block, modulation symbols with respect to a second second data block, and modulation symbols with respect to a third second data block to the OFDM symbol.

Subsequently, the frame mapper 110 may map at least a portion of the second data again to cells which remain after the first data and the second data, which is segmented into the plurality of data blocks, are mapped in the OFDM symbol.

To be specific, the frame mapper 110 may map the first data and the plurality of second data blocks to the cells in the OFDM symbol, calculate a length of at least a portion of each of the second data blocks which is to be mapped again based on the number of cells, which remain after the first data and the plurality of second data blocks are mapped to the OFDM symbol, and the number of the plurality of second data blocks, and map the at least a portion of each of the plurality of second data blocks to the remaining cells based on the calculated length.

In this case, the calculated length may represent the number of modulation symbols of the at least a portion of each of the second data blocks which may be mapped to the remaining cells again, among a plurality of modulation symbols constituting the second data blocks. Also, the calculated length may have the same value with respect to the plurality of second data blocks, or a difference in the calculated lengths with respect to the plurality of second data blocks may be less than 1.

For the above operation, the frame mapper 110 may calculate the number of the cells which remain after the first data and the second data are firstly mapped in the OFDM symbol. Here, the second data constitutes the plurality of second data blocks. In this regard, mapping the second data may be the same as mapping the plurality of second data blocks.

To be specific, the frame mapper 110 may calculate the number of cells which remain after the first data and the second data are firstly mapped, based on the maximum number of cells to which the modulation symbols of the first data and the modulation symbols of the second data may be mapped in the OFDM symbol.

Here, cells to which the modulation symbols of each of the first data and the second data can be mapped among the plurality of cells constituting the OFDM symbol may be referred to as mappable cells. As an example, when there are 8192 cells constituting an 8k OFDM symbol, and the number of cells which are predetermined in order to be used for a different purpose, like a pilot, is 1324, 6868 cells among the 8192 cells except the 1324 cells may be the cells to which the first data and the second data can be mapped.

For example, when the maximum number of cells to which the modulation symbols of the first data and the modulation symbols of the second data can be mapped in the preamble symbol is $N_{preamble\_Available\_Cells}$, the number of cells $N_{preamble\_Remaining\_Cells}$ which remain after the first data and the second data are mapped is the same as $N_{preamble\_Remaining\_Cells} = N_{preamble\_Available\_Cells} - N_{data\_1}/\eta_{MOD\_data\_1} - (N_{data\_2}/\eta_{MOD\_data\_2} \times N_{data\_block\_2})$. Since the first data is the L1-pre signaling and the second data is the L1-post signaling, $N_{preamble\_Remaining\_Cells}$ may be expressed as $N_{preamble\_Remaining\_Cells} = N_{preamble\_Available\_Cells} - N_{L1pre}/\eta_{MOD\_L1pre} - N_{MOD\_L1post\_Total}$. That is, the number of the remaining cells may be a value obtained by subtracting the number of the modulation symbols of each of the first data and the second data from the maximum number of the mappable cells.

As a specific example, in case the first data is modulated by BPSK, $\eta_{MOD\_data\_1}=1$, and thus, $N_{preamble\_Remaining\_Cells}$ is the same as $N_{preamble\_Remaining\_Cells} = N_{preamble\_Available\_Cells} - N_{data\_1} - (N_{data\_2}/\eta_{MOD\_data\_2} \times N_{data\_block\_2})$. As another example, in case the first data is modulated by QPSK, $\eta_{MOD\_data\_1}=2$, and thus, $N_{preamble\_Remaining\_Cells}$ is the same as $N_{preamble\_Remaining\_Cells} = N_{Preamble\_Available\_Cells} - N_{data\_1}/2 - (N_{data\_2}/\eta_{MOD\_data\_2} \times N_{data\_block\_2})$.

In addition, the frame mapper 110 calculates a length of at least a portion, which can be mapped again to the remaining cells, in each of the second data blocks, based on the number of the remaining cells. Here, the length of the at least a portion in each of the second data blocks refers to the number of modulation symbols which may be mapped to the remaining cells among the plurality of modulation symbols constituting the second data blocks. The length of the at least a portion may have the same value with respect to the plurality of second data blocks, or a difference in the calculated lengths with respect to the plurality of second data blocks may be lesser than 1.

In this case, the frame mapper 110 may calculate a length of the at least a portion which may be mapped to the remaining cells in each of the second data blocks according to a predetermined rule.

In this case, the predetermined rule may be determined by a quotient and a remainder obtained by dividing the number of cells which remain after the first data and the plurality of second data blocks are firstly mapped in the OFDM symbol by the number of the second data blocks.

For the above operation, the frame mapper 110 determines whether the number of the remaining cells is an integer multiple of the number of the second data blocks. That is, the frame mapper 110 determines whether a $N_{preamble\_Remaining\_Cells}/N_{data\_block\_2}$ value is an integer multiple. Since the first data is the L1-pre signaling and the second data is the L1-post signaling, the frame mapper 110 determines whether a $N_{preamble\_Remaining\_Cells}/N_{L1post\_FECFRAME}$ value is an integer multiple.

Accordingly, in case that the number of the remaining cells is the integer multiple of the number of the second data blocks (that is, the remainder of $N_{preamble\_Remaining\_Cells}/N_{data\_block\_2}$ is zero), the frame mapper 110 may copy at least a portion of each of the second blocks corresponding to a length of a quotient value obtained by dividing the number of the remaining cells by the number of the second data blocks, from each of the second data blocks, and map the copied portion to the remaining cells.

That is, the frame mapper 110 may copy modulation symbols corresponding to $N_{preamble\_Remaining\_Cells}/N_{data\_block\_2}$ from each of the second data blocks and map again these modulation symbols copied from each of the second data blocks to the remaining cells. Since the first data is the L1-pre signaling and the second data is the L1-post signaling, $N_{preamble\_Remaining\_Cells}/N_{L1post\_FECFRAME}$ is copied and mapped again to the remaining cells.

As described above, when it determined that the number of the remaining cells is the integer multiple of the number of the second data blocks, the frame mapper 110 may divide the remaining cells by the number of the second data blocks, and map again at least a portion having the same length copied from each of the second data blocks to at least one cell of the remaining cells. In this case, the at least a portion of each of the second data blocks is mapped to a cell group of a same number of cells in the remaining cells.

Meanwhile, if it is determined that the number of the remaining cells is not the integer multiple of the number of the second data blocks (that is, the remainder of $N_{preamble\_Remaining\_Cells}/N_{data\_block\_2}$ is not zero), the frame mapper 110 may copy, from at least one of the second data blocks, a portion having a length different from a length of a portion copied from each of the other second data blocks.

For example, the number of the remaining cells and the number of the second data blocks satisfy an equation $N_{preamble\_Remaining\_Cells}=Q \times N_{data\_block\_2}+R$ (R>0). Since the first data is the L1-pre signaling and the second data is the L1-post signaling, $N_{preamble\_Remaining\_Cells}=Q \times N_{L1post\_FECFRAME}+R$ (R>0). That is, the quotient obtained by dividing the number of the remaining cells by the number of the second data blocks is Q and the remainder is R.

In this case, the frame mapper 110 may copy a portion having a length of Q+1 from each of R number of the second data blocks and a portion having a length of Q from each of $(N_{data\_block\_2}-R)$ number of the second data blocks from among the plurality of second data blocks, and map the copied portion to the remaining cells. Since the first data is the L1-pre signaling and the second data is the L1-post signaling, a portion having the length of Q is copied from each of $(N_{L1post\_FECFRAME}-R)$ number of the second data blocks.

That is, the frame mapper 110 may copy Q+1 number of modulation symbols from each of R number of the second data blocks and map the modulation symbols to the remaining cells. In addition, the frame mapper 110 may copy Q number of the modulation symbols from each of $(N_{data\_block\_2}-R)$ number of the second data blocks and map the modulation symbols to the remaining cells.

In this case, the frame mapper 110 may map the portions copied from the second data blocks to the remaining cells in an descending order of length. That is, the frame mapper 110 may sequentially map the copied portions in an descending order of length to the remaining cells in an ascending order of index size.

Referring to the above example, a portion having the length of Q+1 is copied from each of R number of the second data blocks, and a portion having the length of Q is copied from each of ($N_{data\_block\_2}$−R) number of the second data blocks of ($N_{data\_block\_2}$−R). In this case, the frame mapper 110 may sequentially map the copied portions having the length of Q+1 to the remaining cells from a cell of which an index is smallest, and may sequentially map the portions having the length of Q to cells except the cells to which the portions having the length of Q+1 are mapped, among the remaining cells.

As a specific example, it is assumed that $N_{data\_block\_2}$=3, R=2. In this case, the frame mapper 110 copies a portion having the length of Q+1 from each of two second data blocks among three second data blocks, and copies a portion having the length of Q from one second data block. In addition, the frame mapper 110 may sequentially map two portions having the length of Q+1, to the remaining cells from a cell of which an index is smallest, and map the portion having the length of Q to the remaining cells.

As described above, when it is determined that the number of the remaining cells is not an integer multiple of the number of the second data blocks, the frame mapper 110 divides the remaining cells by the number of the second data blocks to generate a plurality of cell groups, and additionally map (i.e., map again) at least a portion copied from each of the second data blocks to each of the divided cell groups. In this case, at least one of the divided cell groups may include a different number of cells from the other cell groups.

As in the aforementioned exemplary embodiments, the frame mapper 110 may sequentially map the first data and the plurality of second data blocks to the cells in the preamble symbol, and additionally map at least a portion of each of the plurality of second data blocks to the remaining cells.

Hereinafter, a method of, when the first data is an L1-pre signaling and the second data is an L1-post signaling, additionally mapping an L1-post signaling will be described in further detail with reference to FIGS. 2 to 12. For convenience of explanation, it is assumed that three L1-post FEC frames exist, and 6868 (=$N_{Preamble\_Available\_Cells}$) cells among an 8k preamble OFDM symbol are used for transmitting an L1 signaling in FIGS. 2 to 12. That is, it is assumed that there are cells constituting an 8k OFDM symbol, the number of cells $N_{Preamble\_Available\_Cells}$ to which the L1-pre signaling and the L1-post signaling may be mapped is 6868.

As described above, the L1-post signaling may be additionally mapped to cells which remain after the L1-pre signaling and the L1-post signaling are mapped to the OFDM symbol. As such, herein, an operation of additionally or repeatedly mapping (or mapping again) an L1-post signaling will be referred to as a repetition scheme or cyclic repetition scheme, and a block which is copied from the L1-post signaling in order to be additionally mapped to the remaining cells will be referred to as a repeated block or a block.

Figure 2:
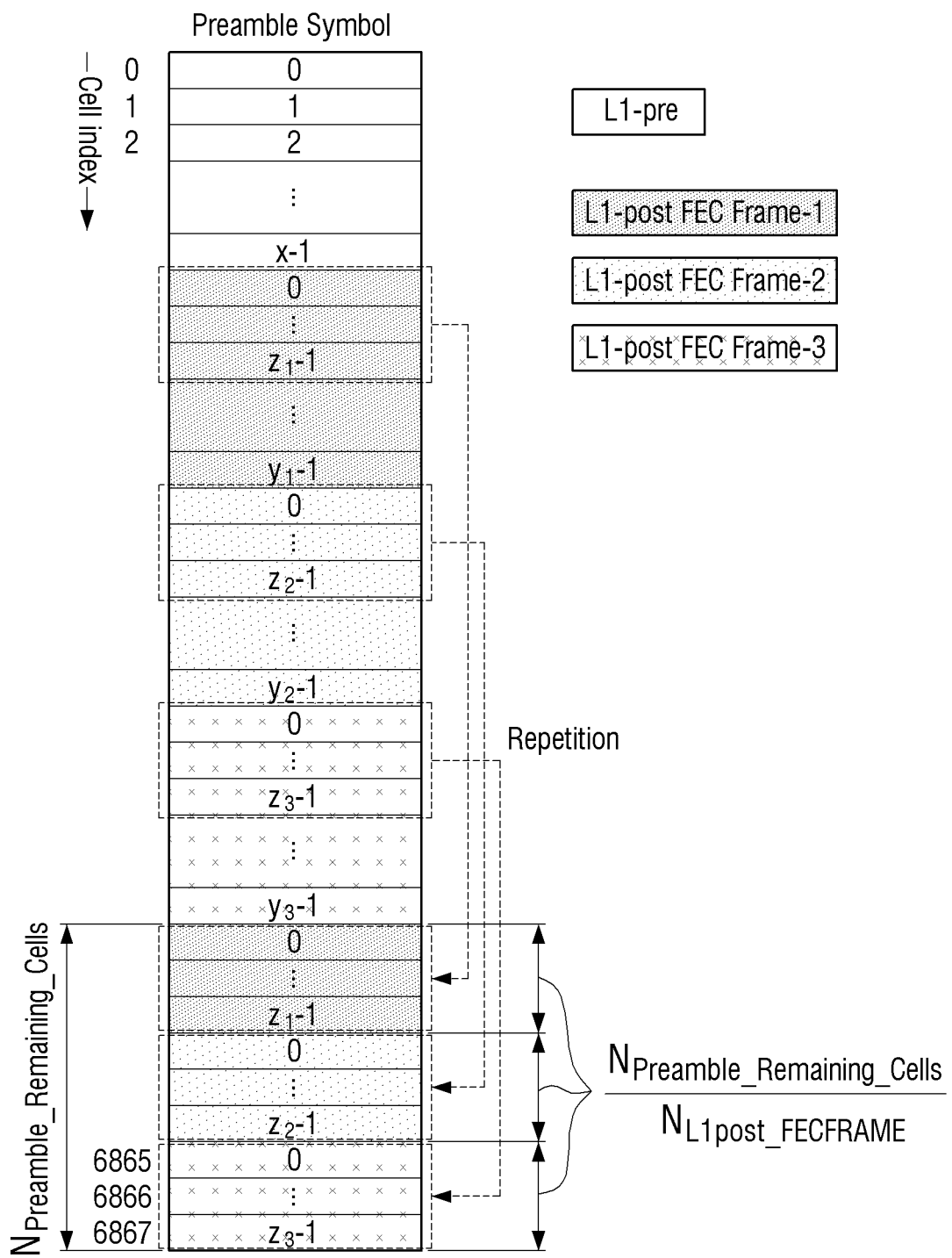
FIGS. 2 to 12 are diagrams provided to describe a method of additionally mapping an L1-post signaling according to exemplary embodiments.

FIG. 2 is a diagram provided to describe a method of additionally mapping L1-post FEC frames to remaining cells when the number of the remaining cells is an integer multiple of the number of L1-post FEC frames.

The frame mapper 110 maps an L1-pre FEC frame and three L1-post FEC frames to a preamble symbol.

For example, as shown in FIG. 2, the frame mapper 110 maps modulation symbols with respect to the L1-pre FEC frame to cells, of an OFDM symbol, of which indexes are 0, 1, . . . , x−1. Here, x may be $N_{L1pre}/\eta_{MOD\_L1pre}$. That is, the frame mapper 110 may sequentially map $N_{L1pre}/\eta_{MOD\_L1pre}$ number of modulation symbols with respect to the L1-pre FEC frame to the cells of which indexes are 0, 1, . . . , x−1.

In addition, as shown in FIG. 2, the frame mapper 110 maps modulation symbols with respect to a first L1-post FEC frame to the cells from a cell next to a cell to which the last modulation symbol with respect to the L1-pre FEC frame is mapped. That is, the frame mapper 110 maps the modulation symbols with respect to the first L1-post FEC frame to $y_1$ number of cells from a cell of which an index is x. Here, $y_1$ may be $N_{MOD\_L1post\_per\_FEC}$. Accordingly, the frame mapper 110 may sequentially map $N_{MOD\_L1post\_per\_FEC}$ number of modulation symbols with respect to the first L1-post FEC frame to the cells from a cell next to the last cell to which the L1-pre FEC frame is mapped.

In addition, as shown in FIG. 2, the frame mapper 110 maps modulation symbols with respect to a second L1-post FEC frame to cells from a cell next to a cell to which the last modulation symbol with respect to the first L1-post FEC frame is mapped. That is, the frame mapper 110 maps the modulation symbols with respect to the second L1-post FEC frame to $y_2$ number of cells from a cell of which an index is x+$y_1$. Here, $y_2$ may be $N_{MOD\_L1post\_per\_FEC}$. Accordingly, the frame mapper 110 may sequentially map $N_{MOD\_L1post\_per\_FEC}$ number of modulation symbols with respect to the second L1-post FEC frame to the cells from a cell next to the last cell to which the first L1-post FEC frame is mapped.

In addition, as shown in FIG. 2, the frame mapper 110 maps modulation symbols with respect to a third L1-post FEC frame to cells from a cell next to a cell to which the last modulation symbol with respect to the second L1-post FEC frame is mapped. That is, the frame mapper 110 maps the modulation symbols with respect to the third L1-post FEC frame to $y_3$ number of cells from a cell of which an index is x+$y_1$+$y_2$. Here, $y_3$ may be $N_{MOD\_L1post\_per\_FEC}$. Accordingly, the frame mapper 110 may sequentially map $N_{MOD\_L1post\_per\_FEC}$ number of modulation symbols with respect to the third L1-post FEC frame to the cells from a cell next to the last cell to which the second L1-post FEC frame is mapped.

In addition, the frame mapper 110 may additionally map three of the L1-post FEC frames to $N_{Preamble\_Remaining\_Cells}$ number of cells which remain after the L1-pre FEC frame and three of the L1-post FEC frames are mapped in the preamble symbol. In this case, a length of at least one portion of each L1-post FEC frame, which is repeatedly mapped, may be $N_{Preamble\_Remaining\_Cells}/N_{L1post\_FECFRAME}$, and each of the repeated at least one portion may be mapped to each of $z_1$ number of cells, $z_2$ number of cells and $z_3$ number of cells. In this case, $z_1=z_2=z_3=N_{Preamble\_Remaining\_Cells}/N_{L1post\_FECFRAME}$.

To be specific, as shown in FIG. 2, the frame mapper 110 copies a portion having a length of $N_{Preamble\_Remaining\_Cells}/N_{L1post\_FECFRAME}$ from the first L1-post FEC frame and sequentially maps the copied portion to cells from a cell next to a last cell to which the third L1-post FEC frame is mapped. In addition, the frame mapper 110 copies a portion having a length $N_{Preamble\_Remaining\_Cells}/N_{L1post\_FECFRAME}$ from the second L1-post FEC frame and sequentially maps the copied portion to cells from a cell next to a last cell where the repeated portion of the first L1-post FEC frame is mapped. In addition, the frame mapper 110 copies a portion having a length of $N_{Preamble\_Remaining\_Cells}/N_{L1post\_FECFRAME}$ from the third L1-post FEC frame and sequentially maps the copied portion to cells from a cell next to a cell where the repeated portion of the second L1-post FEC frame are mapped.

In FIG. 2, it is described that a portion located on a front end of each L1-post FEC frame, that is, modulation symbols generated by bits located on a front end of each L1-post FEC frame is additionally mapped to the remaining cells of the preamble symbol, but this is merely an example. That is, the portion which is additionally mapped to the remaining cells may be copied from a random position of the L1-post FEC frame.

Figure 3:
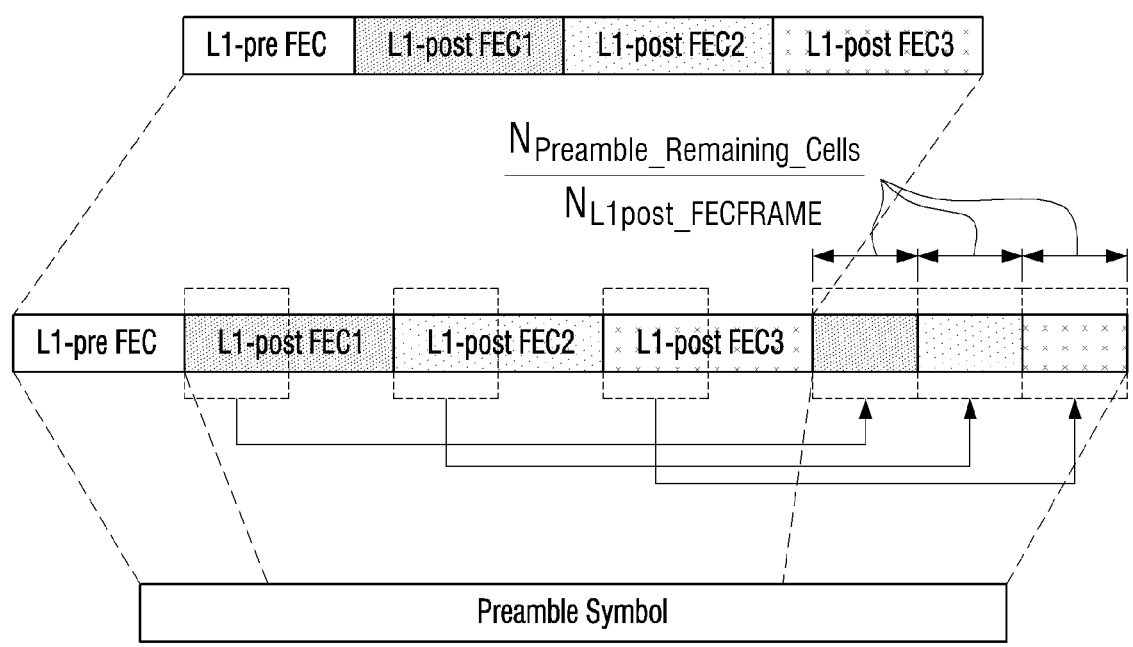
Figure 4:
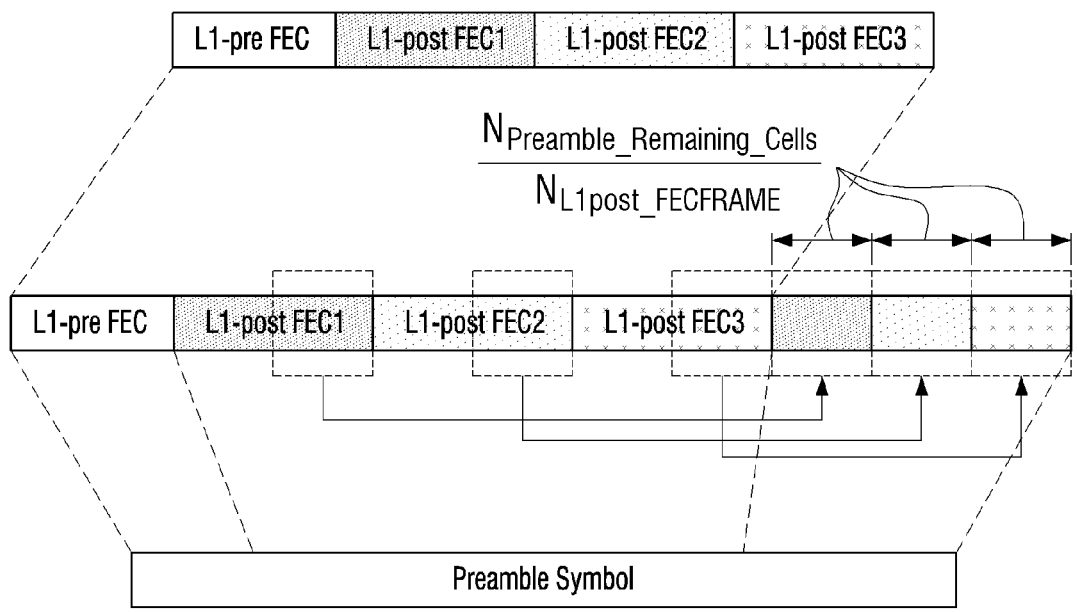
Figure 5:
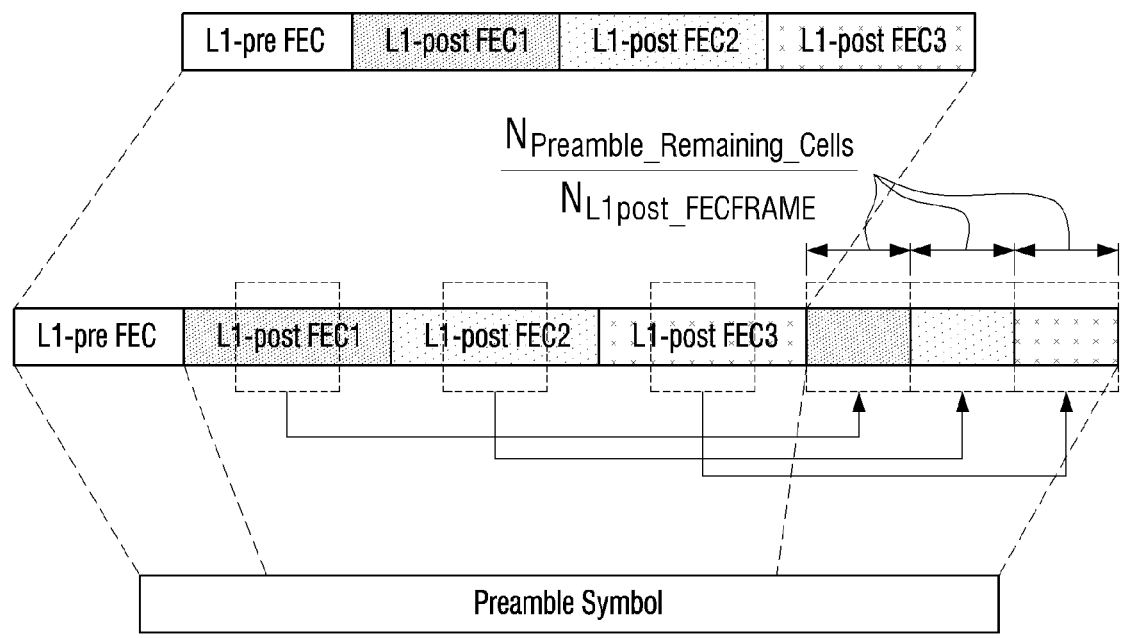

For example, as shown in FIG. 3, the portion located on the front end of each L1-post FEC frame may be copied and additionally mapped to the remaining cells, or a portion located on a rear end of each L1-post FEC frame may be copied and additionally mapped to the remaining cells as shown in FIG. 4. Alternatively, as shown in FIG. 5, a portion located on a middle portion of each L1-post FEC frame may be copied and additionally mapped to the remaining cells. In those cases, the length of the repeated portion may be $N_{Preamble\_Remaining\_Cells}/N_{L1post\_FECFRAME}$.

Figure 6:
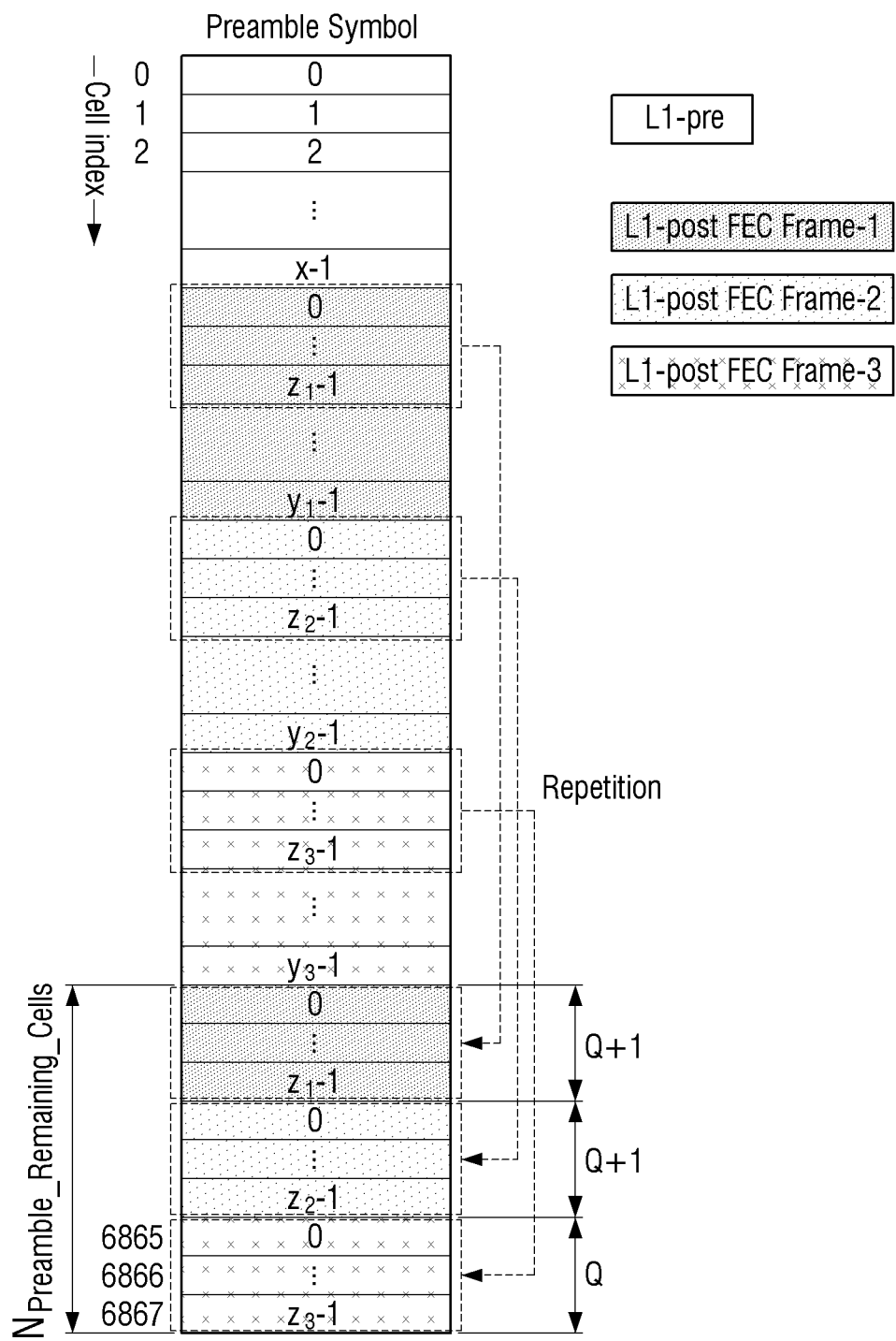

Next, a method of additionally mapping L1-post FEC frames to the remaining cells when the number of the remaining cells is not an integer multiple of the number of the L1-post FEC frames, with reference to FIG. 6.

However, in this case, the method of mapping an L1-pre FEC frame and L1-post FEC frames to a preamble symbol is similar to that as described in reference to FIG. 2. Thus, the overlapped description will be omitted.

The frame mapper 110 may additionally map three L1 FEC frames to cells which remain after the L1-pre FEC frame and the three L1-post FEC frames. Referring to FIG. 6, the number of the remaining cells $N_{preamble\_Remaining\_Cells}$ may be the same as $N_{preamble\_Remaining\_Cells}=Q \times N_{L1post\_FECFRAME}+2$. Accordingly, a length of a portion of the first L1-post FEC frame and a portion of the second L1-post FEC frame, which are repeatedly mapped, may be Q+1, and mapped to $z_1$ number of cells and $z_2$ number of cells, respectively. In this case, $z_1=z_2=Q+1$. In addition, a length of a portion of the third L1-post FEC frame, which is repeatedly mapped, may be Q, and mapped to $z_3$ number of cells. In this case, $z_3=Q$.

In this case, as shown in FIG. 6, the frame mapper 110 copies a portion having the length of Q+1 from the first L1-post FEC frame and sequentially maps the copied portion to cells from a cell next to a last cell to which the third L1-post FEC frame is mapped. In addition, the frame mapper 110 copies a portion having the length of Q+1 from the second L1-post FEC frame and sequentially maps the copied portion to cells from a cell next to a last cell to which the repeated portion of the first L1-post FEC frame is mapped. In addition, the frame mapper 110 copies a portion having the length of Q from the third L1-post FEC frame and sequentially maps the copied portion to cells from a cell next to a last cell to which the repeated portion of the second L1-post FEC frame is mapped.

In FIG. 6, it is described that a portion located on a front end of each L1-post FEC frame is additionally mapped to the remaining cells of the preamble symbol, but this is merely an example. That is, the portion which is additionally mapped to the remaining cells may be copied from a random position of the L1-post FEC frame.

Figure 7:
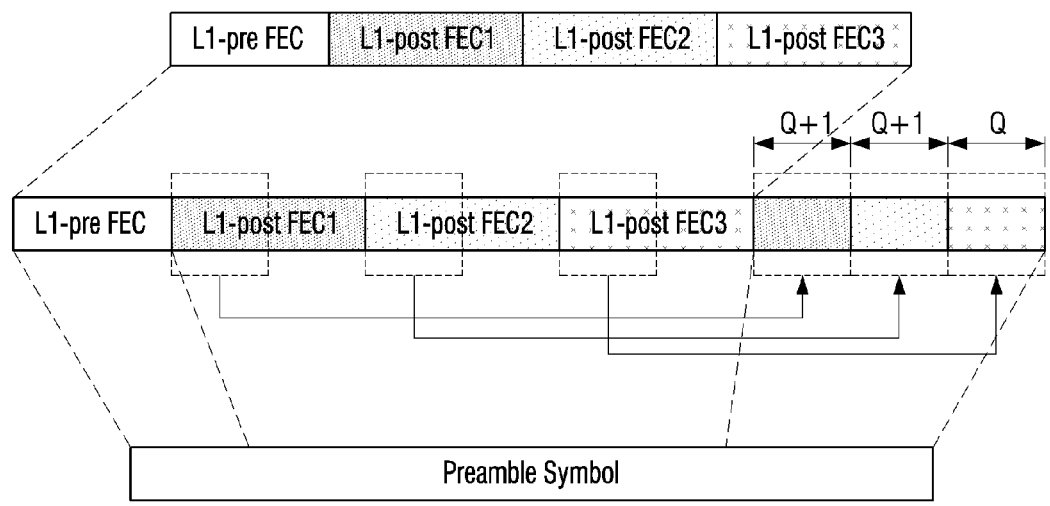
Figure 8:
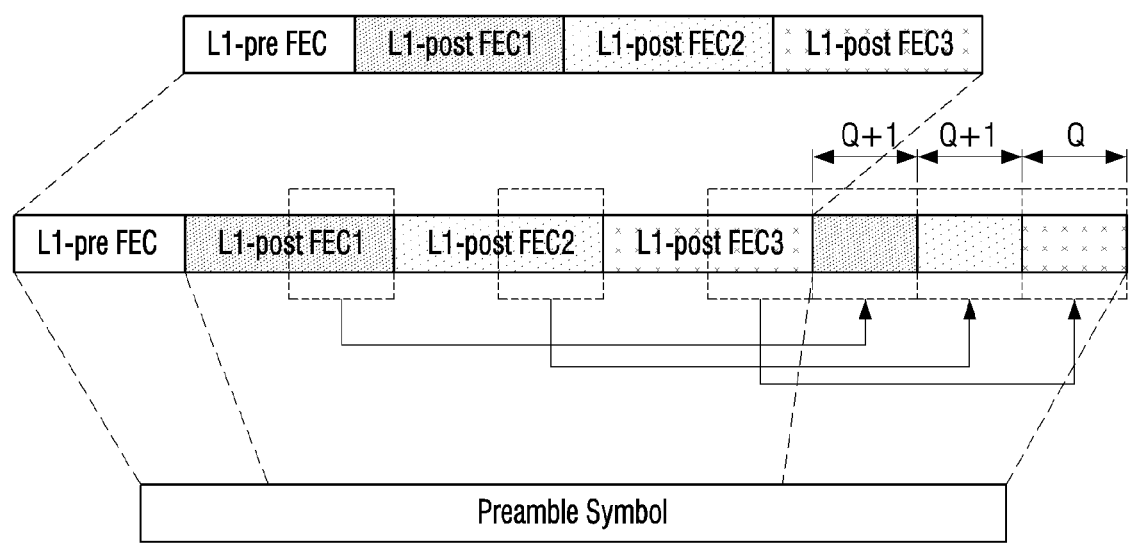
Figure 9:
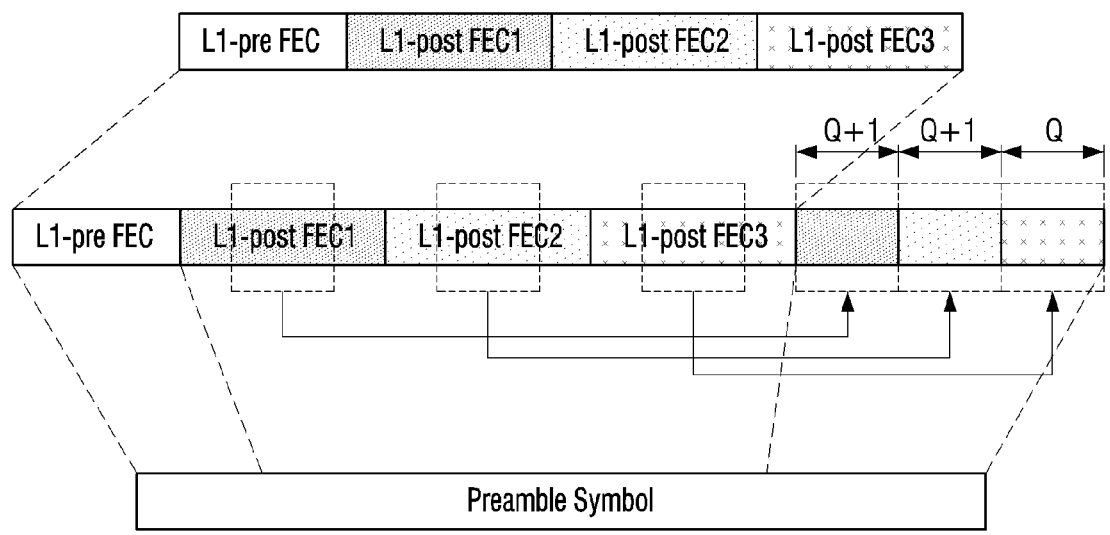

For example, as shown in FIG. 7, the portion located on the front end of each L1-post FEC frame may be copied and additionally mapped to the remaining cells, or a portion located on a rear end of each L1-post FEC frame may be copied and additionally mapped to the remaining cells as shown in FIG. 8. Alternatively, as shown in FIG. 9, a portion located on a middle portion of each L1-post FEC frame may be copied and additionally mapped to the remaining cells. In those cases, the length of the repeated portions of each of the first and the second L1-post FEC frames may be Q+1, and the repeated portion of the third L1-post FEC frame may be Q.

As above, in the present exemplary embodiment, the second data may be additionally mapped to cells which remain after the first data and the second data are mapped to a plurality of cells constituting a single preamble symbol.

In the aforementioned embodiments, it is described that, when the number of the remaining cells is not an integer multiple of the number of the second data blocks, the length of a portion repeated in at least one of the plurality of second data blocks is different from the length of a portion repeated in the other second data blocks. Such difference is intended for filling all of the remaining cells with the second data, which is merely an example.

That is, the frame mapper 110 may not fill all of the cells with the second data.

Hereinafter, the above bit-to-cell mapping operation will be described in further detail by taking an example of a case where the first data is the L1-pre signaling and the second data is the L1-post signaling.

Figure 10:
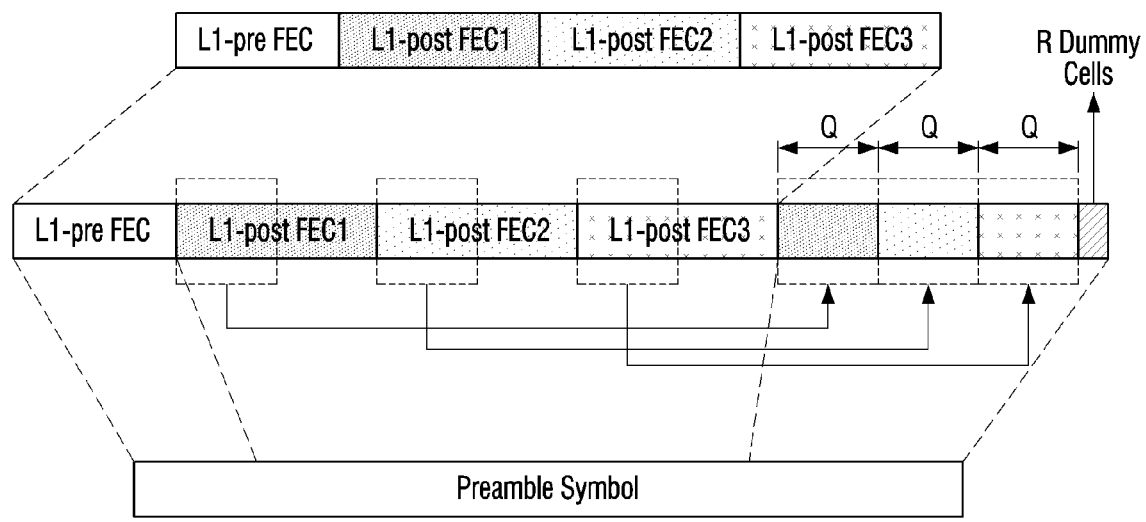

To be specific, when the number of the remaining cells and the number of the L1-post FEC frame satisfy an equation $N_{preamble\_Remaining\_Cells}=Q \times N_{L1post\_FECFRAME}+R$ (R>0), as shown in FIG. 10, the frame mapper 110 may copy a portion having a length of Q from each of the L1-post FEC frames and sequentially map the copied portion to the remaining cells. After the L1-post FEC FRAMEs are additionally mapped in this manner, R number of cells remain. In this case, the R number of cells may be dummy cells, and the frame mapper 110 may map zero bits to the R number of cells.

As described above, according to an exemplary embodiment, even though the number of the remaining cells is not an integer multiple of the number of the L1-post FEC frames, portions having the same length may be copied from the respective L1-post FEC frames and additionally mapped to the remaining cells.

In addition, in the aforementioned example, it is described that at least a portion of each of the second data blocks is additionally mapped to the cells, from a cell next to a last cell to which all of the second data are firstly mapped, but this is merely an example.

That is, the frame mapper 110 may map the first data and a first block among the plurality of second data blocks to cells in an OFDM symbol, and additionally map a portion of the mapped second block to a next cell. In addition, the frame mapper 110 may map another block among the plurality of second data blocks to a cell next to a cell to which the portion of the first block is mapped, and additionally map a portion of the other mapped block to a next cell.

Such repetition scheme will be described in further detail with reference to FIGS. 11 and 12. For convenience of explanation, in FIGS. 11 and 12, the first data is an L1-pre signaling and the second data is an L1-post signaling.

Figure 11:
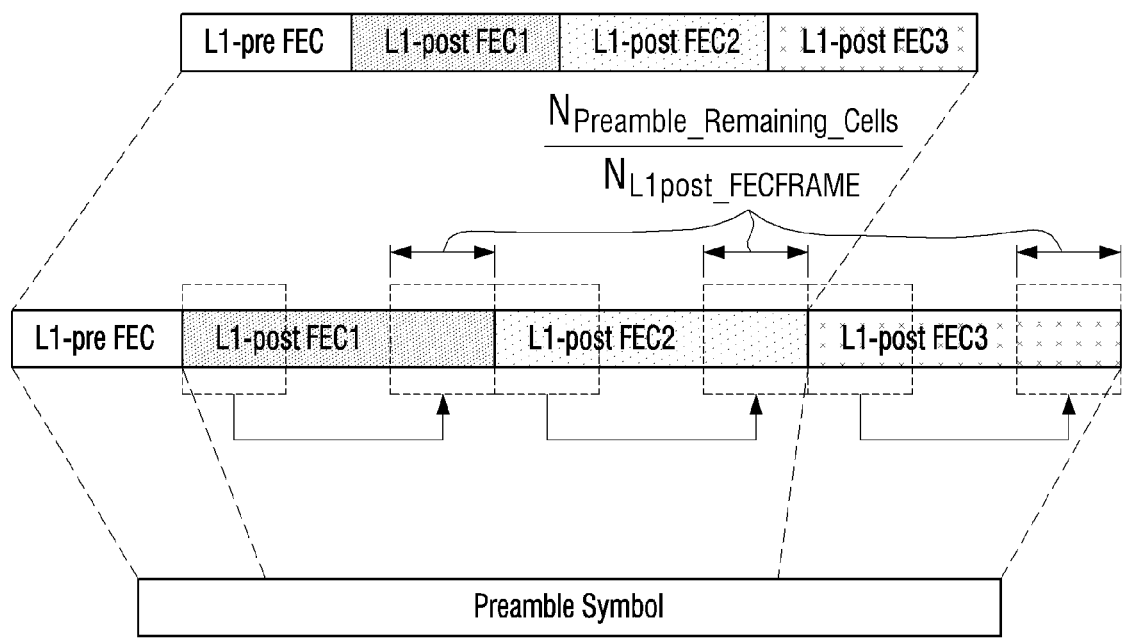

Meanwhile, FIG. 11 shows a case where the number of the remaining cells is an integer multiple of the number of the L1-post FEC frames. In this case, the length of the repeatedly mapped portion of each of the L1-post FEC frames may be $N_{preamble\_Remaining\_Cells}/N_{L1post\_FECFRAME}$. FIG. 12 shows a case where the number of the remaining cells is not an integer multiple of the number of the L1-post FEC frames. In this case, the number of the remaining cells and the number of the L1-post FEC frames may satisfy $N_{preamble\_Remaining\_Cells}=Q \times N_{L1post\_FECFRAME}+R$ (R>0).

The frame mapper 110 maps the L1-pre signaling and a first frame among the plurality of L1-post FEC frames to the cells of the preamble symbol. That is, as shown in FIGS. 11 and 12, the frame mapper 110 sequentially maps the L1-pre FEC frame and the first L1-post FEC frame to a plurality of cells constituting a preamble symbol.

In addition, the frame mapper 110 copies a portion having a certain length from the first L1-post FEC frame and sequentially maps the copied blocks to cells from a cell next to a last cell to which the first L1-post FEC frame is mapped. In this case, in FIG. 11, the length of the copied blocks may be $N_{preamble\_Remaining\_Cells}/N_{L1post\_FECFRAME}$, and in FIG. 12, the length of the copied blocks may be Q+1.

Subsequently, the frame mapper 110 maps the second L1-post FEC frame from a cell next to a last cell to which the copied portion from the first L1-post FEC frame is mapped. In addition, the frame mapper 110 copies a portion having a certain length from the second L1-post FEC frame and sequentially maps the copied portion from a cell next to a cell to which the second L1-post FEC frame is mapped. In this case, in FIG. 11, the length of the copied portion may be $N_{preamble\_Remaining\_Cells}/N_{L1post\_FECFRAME}$, and in FIG. 12, the length of the copied portion may be Q+1.

Subsequently, the frame mapper 110 maps the third L1-post FEC frame from a cell next to a last cell to which the copied portion of the second L1-post FEC frame is mapped. In addition, the frame mapper 110 copies a portion having a certain length from the third L1-post FEC frame and sequentially maps the copied portion from a cell next to a last cell to which the third L1-post FEC frame is mapped. In this case, in FIG. 11, the length of the copied portion from the third L1-post FEC frame may be $N_{preamble\_Remaining\_Cells}/N_{L1post\_FECFRAME}$, and in FIG. 12, the length of the copied portion from the third L1-post FEC frame may be Q.

As described above, the frame mapper 110 may perform the repetition scheme by mapping the L1-post FEC frames, copying a portion having a certain length from the L1-post FEC frame, and mapping the copied portion after the previously mapped L1-post FEC frame.

Figure 12:
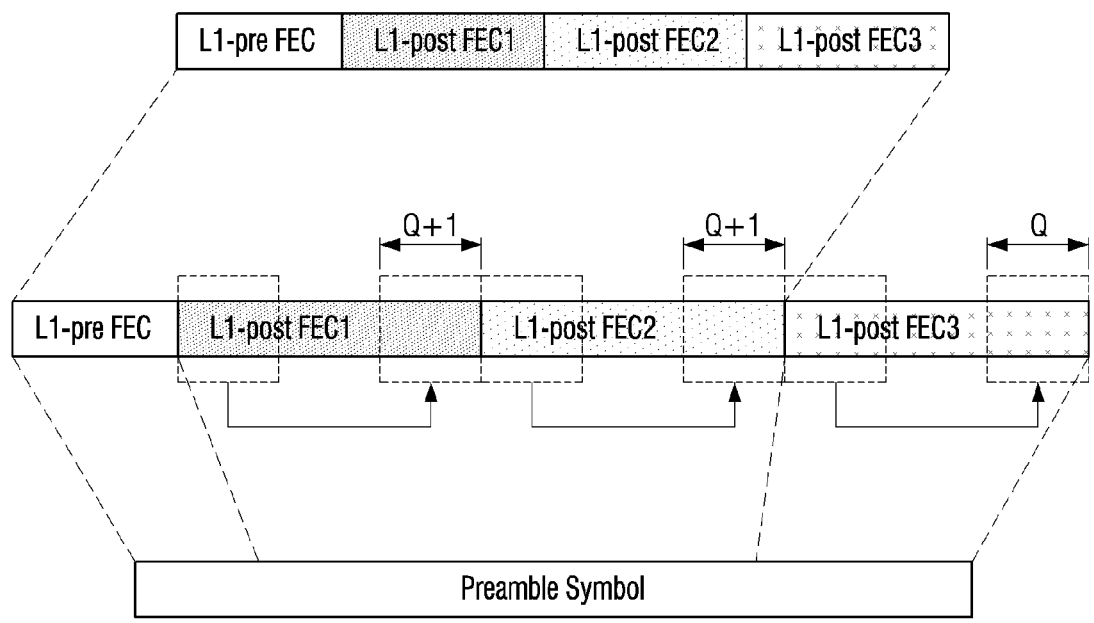

In FIGS. 11 and 12, it is described that a portion located on a front end of each L1-post FEC frame is additionally mapped to the remaining cells of the preamble symbol, but this is merely an example. That is, in FIGS. 11 and 12, the portion which is additionally mapped to the remaining cells may be copied from a random position of the L1-post FEC frame.

Meanwhile, in the aforementioned exemplary embodiments, it is described that the first data and a plurality of second data blocks are mapped to the preamble symbol, but it is merely an example.

That is, if the second data is not segmented, the frame mapper 110 may map the first data and the second data, which is not segmented, to the preamble symbol.

In this case, the frame mapper 110 may additionally map the second data to the cells which remain after the first data and the second data, which is not segmented, are mapped in the preamble symbol.

Hereinafter, an example of a case where the first data is the L1-pre signaling and the second data is the L1-post signaling will be described.

To be specific, the frame mapper 110 may calculate the number of cells which remain after the L1-pre FEC frame and the L1-post FEC frame are mapped. In this case, the method of calculating the number of the remaining cells is the same as the method described above. However, $N_{L1post\_FECFRAME}=1$, and thus, $N_{MOD\_L1post\_Total}$ may be $N_{MOD\_L1post\_per\_FEC}$.

In addition, the frame mapper 110 may additionally map the L1-post FEC frame to the remaining cells based on the number of the remaining cells.

To be specific, if the number of the remaining cells is greater than the number of modulation symbols with respect to the L1-post FEC frame, the frame mapper 110 may additionally map the L1-post FEC frame to the remaining cells, copy a portion having a length corresponding to the number of cells, still remaining after additionally mapping the L1-post FEC frame, from the L1-post FEC frame, and additionally map the copied portion to the remaining cells.

By contrast, if the number of the remaining cells is less than the number of the modulation symbols with respect to the L1-post FEC frame, the frame mapper 110 may copy a portion having a length corresponding to the number of the remaining cells from the L1-post FEC frame, and map the copied portion to the remaining cells.

Referring back to FIG. 1, the transmitting unit 120 may transmit an OFDM frame including a preamble symbol and a data symbol. To be specific, the transmitting unit 120 may include an antenna (not shown), and transmit an OFDM frame including a preamble symbol to which the first data and the second data are mapped to the receiving apparatus 1500 through an allocated channel. In this case, the frame may further include data symbols in addition to the preamble symbol.

The preamble symbol may include at least one OFDM symbols. The data symbol may include a plurality of OFDM symbols.

For example, in case the first data is the L1-pre signaling and the second data is the L1-post signaling, broadcasting data may be modulated and mapped to a data symbol. In this case, the frame mapper 110 may map the broadcasting data to the data symbol, or the transmitting apparatus 100 may include a component for mapping the broadcasting data to the data symbol.

In the aforementioned exemplary embodiments, it is described that the first data and the second data are mapped to a preamble symbol among a plurality of OFDM symbols constituting an OFDM frame, and other data (for example, broadcasting data) is mapped to the data symbol, but it is merely an example.

That is, the first data and the second data may be mapped to the data symbol. That is, if a cell to which the first data and the second data may be mapped exists in the data symbol, the first data and the second data may be mapped to the data symbol.

In addition, other data may be mapped to the preamble symbol. That is, broadcasting data, as well as the first data and the second data, may be mapped to the preamble symbol. In this case, the other cells than a cell which is predetermined to be used for a different use, for example, a pilot and broadcasting data, may be a cell to which the first data and the second data may be mapped.

In addition, it is described that the preamble symbol includes one OFDM symbol, but it is merely an example. That is, the preamble symbol may include a plurality of OFDM symbols. In this case, the first data and the second data may be mapped to mappable cells among a plurality of cells constituting the plurality of OFDM symbols.

Meanwhile, as described above, each of the first data and the second data may be modulated and input to the frame mapper 110.

For such operation, the transmitting apparatus 100 may further include a component for processing the first data and the second data.

Figure 13A:
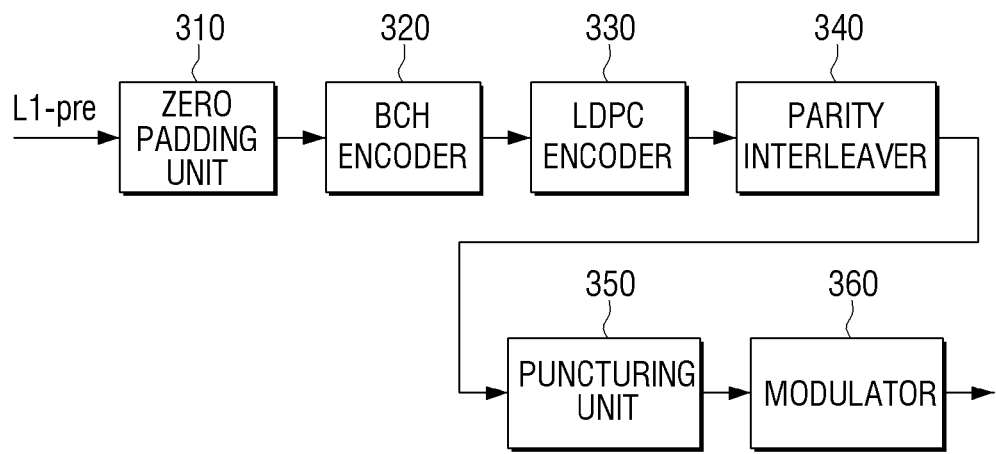
FIGS. 13A, 13B, 14A and 14B are block diagrams provided to describe a specific structure of a transmitting apparatus according to exemplary embodiments.
Figure 13B:
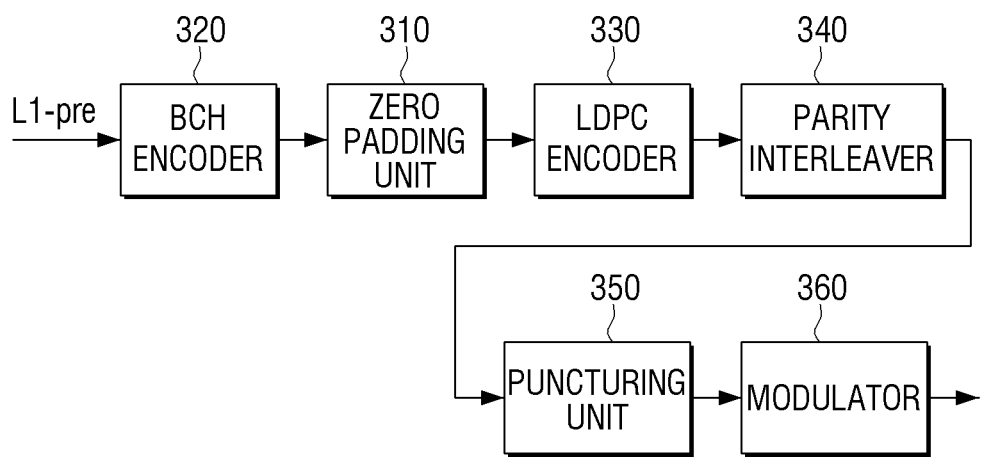
Figure 14A:
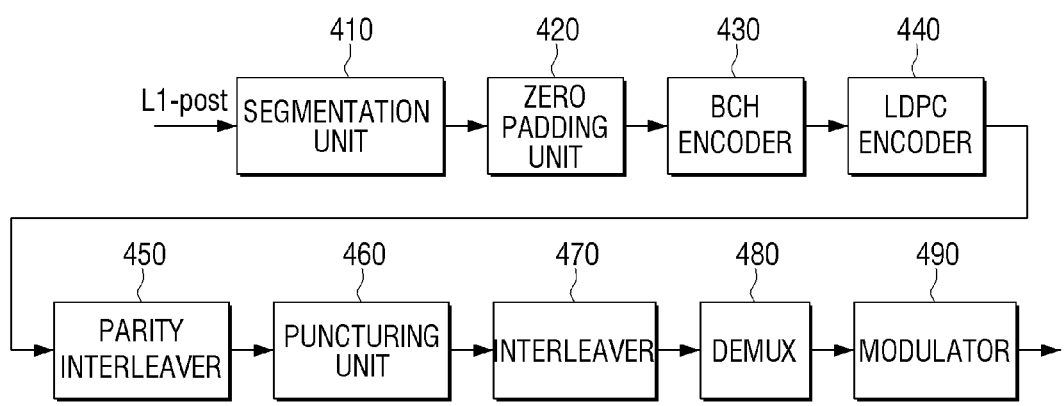
Figure 14B:
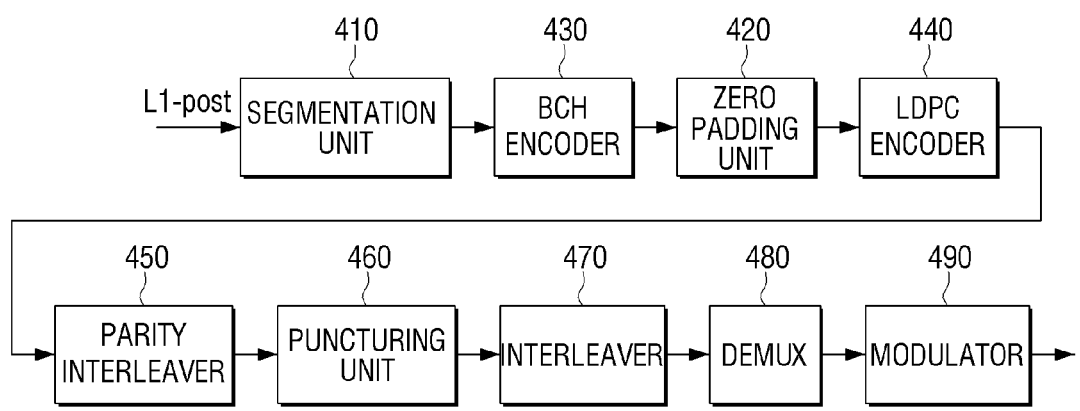

For example, in case the first data is the L1-pre signaling and the second data is the L1-post signaling, the transmitting apparatus 100 may further include components for processing the L1-pre signaling as in FIGS. 13A-13B and components for processing the L1-post signaling as in FIGS. 14A-14B.

Accordingly, hereinafter, a method of processing each of the L1-pre signaling and the L1-post signaling will be described in detail with reference to FIGS. 13 and 14. However, FIGS. 13A-13B and FIGS. 14A-14B are merely the examples, and L1-pre signaling and L1-post signaling may be processed by various methods and provided to the frame mapper 110. Although FIGS. 13A-13B and FIGS. 14A-14B illustrate that the L1-pre signaling and the L1-post signaling are processed separately, this is merely an example. According to another exemplary embodiment, the components indicated by a same term may process both of the two signalings. For example, a Low Density Parity Check (LDPC) encoder 330 for LDPC encoding of the L1-pre signaling illustrated in FIGS. 13A-13B may also be used for LDPC encoding of the L1-post signaling.

As shown in FIG. 13A, the transmitting apparatus 100 processes the L1-pre signaling, and may include a zero padding unit 310, a Bose, Chaudhuri, Hocquenghem (BCH) encoder 320, an LDPC encoder 330, a parity interleaver 340, a puncturing unit 350, and a modulator 360.

The zero padding unit 310 pads zero bits to the L1-pre signaling.

The BCH encoder 320 generates a BHC codeword according to a BCH encoding operation and outputs the generated BCH codeword to the LDPC encoder 330. The LDPC encoder 330 may perform an LDPC encoding operation which encodes the BCH codeword as information word bits. In this case, the LDPC encoding operation performed by the LDPC encoder 330 requires the information word bits having a certain length. Thus, the BCH encoder 320 should generate a BCH codeword having a certain length.

In order for the BCH encoder 320 to generate a BCH codeword having a certain length, the BCH encoding operation should be performed with respect to bits of a certain number. A length of the L1-pre signaling is invariable (for example, the L1-pre signaling may include 200 bits). Accordingly, the zero padding unit 310 may pad zero bits to the L1-pre signaling so that the L1-pre signaling has a length of the information word bits required in the BCH encoding operation, and output the L1-pre signaling where the zero bits are padded to the BCH encoder 320.

The BCH encoder 320 performs the BCH encoding operation with respect to an output of the zero padding unit 310. To be specific, the BCH encoder 320 may generate BCH parity bits by performing the BCH encoding operation on the input bits as information word bits, and output a BCH codeword (that is, BCH encoded bits) including the information word bits and the BCH parity bits to the LDPC encoder 330. Herein, the BCH parity bits may include 168 bits.

The LDPC encoder 330 performs an LDPC encoding operation with respect to an output of the BCH encoder 320. To be specific, the LDPC encoder 330 may generate LDPC parity bits by performing an LDPC encoding operation on input bits as information word bits, and may output an LDPC codeword (that is, the LDPC encoded bits) including the information word bits and the LDPC parity bits to the parity interleaver 340.

In this case, the LDPC encoder 330 may generate an LDPC codeword having a certain length by performing an LDPC encoding operation based on various code rates.

For example, when a length $K_{bch}$ of the information word bits of the BCH encoder 320 is 13872 and a length $K_{ldpc}$ of the information word bits of the LDPC encoder 330 is 14040, the LDPC encoder 330 may generate an LDPC encoding operation at a code rate of 13/15. In this case, a length $N_{ldpc}$ of the LDPC codeword may be 16200.

As described above, the LDPC codeword generated by the LDPC encoder 330 may be called an L1-pre FEC FRAME (or, an L1-pre signaling block).

The parity interleaver 340 performs an interleaving operation with respect to an output of the LDPC encoder 330. To be specific, the parity interleaver 340 may perform an interleaving operation with respect to LDPC parity bits among bits constituting the LDPC codeword and output parity interleaved LDPC codeword to the puncturing unit 350.

In this case, the parity interleaver 340 may perform a parity interleaving operation based on various interleaving rules.

As an example, the parity interleaver 340 may interleave only the LDPC parity bits among the LDPC codewords $C=(c_0, c_1, \ldots, c_{N_{ldpc}-1})$ output from the LDPC encoder 330 based on following Equation 1 and output a parity interleaved LDPC codeword $U=(u_0, u_1, \ldots, u_{N_{ldpc}-1})$ to the puncturing unit 350.

$u_i = c_i$ for $0 \le i < K_{ldpc}$ (information bits are not interleaved.)

$$u_{K_{ldpc}+360t+s} = c_{K_{ldpc}+Q_{ldpc}s+t} \text{ for } 0 \le s < 360, 0 \le t < Q_{ldpc} \qquad (1),$$

where $Q_{ldpc}$ may be 6.

The puncturing unit 350 may puncture a part of bits output from the parity interleaver 340. In this case, puncturing refers to removing a part of LDPC parity bits so as not to be transmitted. The punctured LDPC parity bits may not be transmitted.

To be specific, the puncturing unit 350 may puncture a part of the LDPC parity bits output from the parity interleaver 340. For example, the puncturing unit 350 may puncture $N_{punc}$ number of LDPC parity bits.

In addition, the puncturing unit 350 may remove the zero bits padded by the zero padding unit 310 from among bits outputted from the parity interleaver 340.

To be specific, the puncturing unit 350 may remove the zero bits padded by the zero padding unit 310 from among the bits outputted from the parity interleaver 340 based on a location and the number of the zero bits padded by the zero padding unit 310. An operation of removing the padded zero bits is referred to as shortening.

That is, the puncturing unit 350 may output bits which remain after the puncturing and shortening operations are performed to the modulator 360. For example, since the length of the L1-pre signaling is $K_{sig}$, the LDPC parity bits are $N_{ldpc\_parity\_L1pre}$, and the number of bits to be punctured is $N_{punc}$, $N_{L1pre}$ number of bits input to the modulator 360 is $N_{L1pre} = K_{sig} + 168 + (N_{ldpc\_parity\_L1pre} - N_{punc})$. In this case 168 refers to the number of the BCH parity bits.

The modulator 360 may modulate an output of the puncturing unit 350. To be specific, the modulator 360 may generate a modulation symbol by mapping bits outputted from the puncturing unit 350 with a constellation point by using various modulation methods such as BPSK, QPSK, 16-QAM, 64-QAM, 256-QAM and 1024-QAM and output the modulation symbol to the frame mapper 110.

In this case, when the modulation methods are PSK, QPSK, 16-QAM, 64-QAM, 256-QAM, and 1024-QAM, the number of bits constituting the modulation symbol (or, modulated cell) may be 1, 2, 4, 6, 8 and 10, respectively.

As described above, the modulator 360 maps bits output from the puncturing unit 350 to constellation points. In this regard, the modulator 360 may be called a constellation mapper.

That is, as described above, an L1-pre signaling formed of $K_{sig}$ number of bits is encoded to generate $N_{L1pre}$ number of bits to constitute an L1-pre FEC FRAME, and the L1-pres FEC FRAME may be modulated and mapped to a preamble symbol by the frame mapper 110.

In FIG. 13A, the zero padding unit 310, the BCH encoder 320, and the LDPC encoder 330 are arranged in order, but it is merely an example. That is, as shown in FIG. 13B, the zero padding unit 310 may be disposed between the BCH encoder 320 and the LDPC encoder 330.

In this case, an arrangement of the components is different from the arrangement as described in FIG. 13A, but operations performed by the components and used parameters are the same. Accordingly, the aforementioned difference will be described below.

Referring to FIG. 13B, the BCH encoder 320 may generate a BCH codeword by performing a BCH encoding operation with respect to the L1-pre signaling and may output a BCH codeword to the zero padding unit 310.

The zero padding unit 310 pads the zero bits to the BCH codeword and outputs the BCH codeword, where the zero bits are padded, to the LDPC encoder 330. For example, if a length of the BCH codeword is $N_{bch}$, and a length of an information word required for the LDPC encoding operation is $K_{ldpc}$, the zero padding unit 310 may pad the zero bits of $K_{ldpc}-N_{bch}$ to the BCH codeword.

The LDPC encoder 330 may generate an LDPC codeword by performing an LDPC encoding operation with respect to the BCH codeword where the zero bits are padded, and may output the LDPC codeword to the parity interleaver 340. In this case, the BCH codeword where the zero bits are padded is formed of $K_{ldpc}$ number of bits, and thus, the LDPC encoder 330 may generate an LDPC codeword having a length of $N_{ldpc}$ by performing the LDCP encoding with respect to the BCH codeword where the zero bits are coded.

In addition, even though it is not illustrated in FIGS. 13A-13B, the transmitting apparatus 100 may further include a scrambler (not shown). The scrambler (not shown) may randomize input bits and output randomized bits. In FIG. 13A, such scrambler (not shown) may be disposed prior to the zero padding unit 310. In FIG. 13B, the scrambler (not shown) may be disposed prior to the BCH encoder 320.

Meanwhile, in order to process the L1-post signaling as shown in FIGS. 14A-14B, the transmitting apparatus 100 may further include a segmentation unit 410, a zero padding unit 420, a BCH encoder 430, an LDPC encoder 440, a parity interleaver 450, a puncturing unit 460, an interleaver 470, a demux 480, and a modulator 490.

The segmentation unit 410 segments the L1-post signaling. Since a length of the L1-post signaling is variable, the segmentation unit 420 may segment the L1-post signaling into a plurality of L1-post signaling so that a segmented L1-post signaling may have bits fewer than a predetermined number, and output each of the segmented L1-post signalings to the zero padding unit 420.

The zero padding unit 420 pads zero bits to each of the segmented L1-post signaling.

The BCH encoder 430 generates a BCH codeword through a BCH encoding operation and output the generated BCH codeword to the LDPC encoder 440. The LDPC encoder 440 may perform an LDPC encoding operation with respect to the BCH codeword as information words bits for the LDPC encoding. For the LDPC encoding operation which is performed in the LDPC encoder 440, information word bits in a certain length are required. Thus, the BCH encoder 430 should generate a BCH codeword having a certain length.

In order for the BCH encoder 430 to generate a BCH codeword having a certain length, the BCH encoding operation should be performed with respect to the certain number of bits. Accordingly, the zero padding unit 420 may pad the zero bits to each of the segmented L1-post signaling so that the segmented L1-post signaling have the length of the information word bits required in the BCH encoding operation, and output each of the L1-post signaling to which the zero bits are padded to the BCH encoder 430.

The BCH encoder 430 performs the BCH encoding operation with respect to an output of the zero padding unit 420. To be specific, the BCH encoder 430 may generate BCH parity bits by performing the BCH encoding operation with respect to each of input bits as an information word bit, and output a plurality of BCH codewords (that is, BCH encoded bits) formed of the information word bits and the BCH parity bits to the LDPC encoder 440. In this case, the BCH parity bits may be 168 bits.

The LDPC encoder 440 performs an LDPC encoding operation with respect to an output of the BCH encoder 430. To be specific, the LDPC encoder 440 may generate LDPC parity bits by performing the LDPC encoding operation with respect to each of the input bits as an information word bit and output a plurality of LDPC codewords (that is, LDPC encoded bits) formed of the information word bits and the LDPC parity bits to the parity interleaver 450.

In this case, the LDPC encoder 440 may generate a plurality of LDPC codewords having a certain length by performing the LDPC encoding operation based on various code rates.

For example, when a length $K_{bch}$ of the information word bits of the BCH encoder 430 is 13872, and a length $K_{ldpc}$ of the information word bits of the LDPC encoder 440 is 14040, the LDPC encoder 440 may generate an LDPC codeword by performing the LDPC encoding operation at a code rate of 13/15. In this case, a length $N_{ldpc}$ of each LDPC codeword may be 16200.

Accordingly, each of the LDPC codewords output from the LDPC encoder 440 may be referred to as an L1-post FEC FRAME (or, L1-post signaling block).

The parity interleaver 450 performs an interleaving operation with respect to an output of the LDPC encoder 440. To be specific, the parity interleaver 450 may perform an interleaving operation with respect to LDPC parity bits among bits constituting each LDPC codeword, and output each of parity interleaved LDPC codewords to the puncturing unit 460.

In this case, the parity interleaver 450 may perform a parity interleaving operation based on various interleaving rules.

As an example, based on following Equation 2, the parity interleaver 450 may interleave only the LDPC parity bits among the LDPC codewords $C=(c_0, c_1, \ldots, c_{N_{ldpc}-1})$ output from the LDPC encoder 330 and output a parity interleaved LDPC codeword $U=(u_0, u_1, \ldots, u_{N_{ldpc}-1})$ to the puncturing unit 460.

$u_i=c_i$ for $0 \leq i < K_{ldpc}$ (information bits are not interleaved.)

$$u_{K_{ldpc}+360t+s}=c_{K_{ldpc}+Q_{ldpc}s+t} \text{ for } 0 \leq s < 360, 0 \leq t < Q_{ldpc} \quad (2),$$

where $Q_{ldpc}$ may be 24.

The puncturing unit 460 may puncture a part of bits which are output from the parity interleaver 450. In this case, puncturing refers to removing a part of LDPC parity bits so as not to be transmitted. The punctured LDPC parity bits may not be transmitted.

To be specific, the puncturing unit 460 may puncture a part of each of the LDPC parity bits which are output from the parity interleaver 450. For example, the puncturing unit 460 may puncture $N_{punc}$ number of LDPC parity bits.

In addition, the puncturing unit 460 may remove the zero bits padded by the zero padding unit 20 from among bits outputted from the parity interleaver 450.

To be specific, the puncturing unit 460 may remove the zero bits padded by the zero padding unit 420 from among the bits outputted from the parity interleaver 450 based on a location and the number of the zero bits padded by the zero padding unit 420. An operation of removing the padded zero bits is referred to as shortening.

That is, the puncturing unit 460 may output bits which remain after the puncturing and shortening operations are performed to the interleaver 470. For example, since the length of the segmented L1-post signaling is $K_{sig}$, the LDPC parity bits are $N_{ldpc\_parity\_L1post}$, and the number of bits to be punctured is $N_{punc}$, $N_{L1post}$ number of bits input to the interleaver 470 is $N_{L1post} = K_{sig} + 168 + (N_{ldpc\_parity\_L1post} - N_{punc})$. In this case, 168 refers to the number of the BCH parity bits.

The interleaver 470 performs an interleaving operation with respect to an output of the puncturing unit 460. To be specific, the interleaver 470 interleaves each of the plurality of LDPC codewords which are output from the puncturing unit 460 and outputs each of the interleaved LDPC codewords to the demux 480.

In this case, the interleaver 470 may interleave bits which are output from the puncturing unit 460 by using $N_c$ number of columns and $N_r$ number of rows.

To be specific, the interleaver 470 may write the bits which are output from the puncturing unit 460 in a column direction from the first column to the $N_c^{th}$ column. In addition, the interleaver 470 may perform the interleaving operation by reading a plurality of columns where the bits are written in a row direction from the first row to the $N_r^{th}$ row. Accordingly, the bits written on the same row of each column may be output sequentially, and thus, an order of the bits may be rearranged differently from an arrangement before the interleaving operation.

The demux (or, demultiplexer) 480 performs a demultiplexing operation with respect to an output of the interleaver 470.

To be specific, the demux 480 may perform bit-to-cell conversion with respect to each of the LDPC codewords output from the interleaver 470 and demultiplex each of the LDPC codewords to cells having a certain number of bits.

For example, the demux 480 may output bits constituting each of the LDPC codewords which are output from the interleaver 470 sequentially to a plurality of sub-streams sequentially, convert the bits of each of the LDPC codewords to a cell, and output the cell. In this case, bits which have a same index in each of the plurality of sub-streams may from a same cell.

In this case, the number of the sub-streams is the same as the number of the bits constituting a cell. For example, when the modulation methods are BPSK, QPSK, 16-QAM, 64-QAM, 256-QAM, 1024-QAM, the number of the sub-streams may be 1, 2, 4, 6, 8, and 10, respectively, and the number of cells may be $N_{L1post}$, $N_{L1post}/2$, $N_{L1post}/4$, $N_{L1post}/6$, $N_{L1post}/8$, and $N_{L1post}/10$, respectively.

The modulator 490 may modulate cells which are output from the demux 480. To be specific, the modulator 490 may modulate the cells output from the demux 480 by mapping the cells to constellation points by using various modulation methods such as BPSK, QPSK, 16-QAM, 64-QAM, 256-QAM and 1024-QAM.

In this case, when the modulation methods are BPSK, QPSK, 16-QAM, 64-QAM, 256-QAM and 1024-QAM, the number of bits constituting a modulated cell (that is, modulation symbol) may be 1, 2, 4, 6, 8, 10, respectively.

As described above, the modulator 490 maps cells which are output from the demux 480 to the constellation points. In this regard, the modulator 490 may be called the constellation mapper.

That is, as described above, a segmented L1-post signaling formed of $K_{sig}$ number of bits is encoded to generate of $N_{L1post}$ number of bits to constitute an L1-post FEC frame. In this case, each of a plurality of segmented L1-post signalings is encoded, and thus, a plurality of L1-post FEC frames may be generated. The plurality of L1-post FEC FRAMEs may be modulated and mapped to the preamble symbol by the frame mapper 110.

However, as described above, if the L1-post signaling is formed of bits fewer than a predetermined number, the segmentation unit 410 may output the L1-post signaling without performing a segmentation operation. In this case, the L1-post signaling may be encoded to generate a single L1-post FEC frame.

Meanwhile, in FIG. 14A, the zero padding unit 420, the BCH encoder 430, and the LDPC encoder 4400 are arranged in order, but it is merely an example. That is, as shown in FIG. 15B, the zero padding unit 420 may be disposed between the BCH encoder 430 and the LDPC encoder 440.

In this case, an arrangement of components is different from the arrangement as described in FIG. 14A, but operations performed by the components and used parameters are the same. Accordingly, the aforementioned difference will be described below.

Referring to FIG. 14B, the BCH encoder 430 may generate a BCH codeword by performing a BCH encoding operation with respect to a segmented L1-post signaling and output a BCH codeword to the zero padding unit 420.

The zero padding unit 420 pads the zero bits to the BCH codeword and outputs the BCH codeword, where the zero bits are padded, to the LDPC encoder 440. For example, if a length of the BCH codeword is $N_{bch}$, and a length of an information word required for the LDPC encoding operation is $K_{ldpc}$, the zero padding unit 420 may pad the zero bits of $K_{ldpc} - N_{bch}$ to the BCH codeword.

The LDPC encoder 440 may generate an LDPC codeword by performing an LDPC encoding operation with respect to the BCH codeword where the zero bits are padded and output the LDPC codeword to the parity interleaver 430. In this case, the BCH codeword where the zero bits are padded cis formed of $K_{ldpc}$ number of bits. In this regard, the LDPC encoder 440 may generate an LDPC codeword having a length of $N_{ldpc}$ by performing the LDPC encoding operation with respect to the BCH codeword where the zero bits are padded.

In addition, even though it is not illustrated in FIGS. 14A-14B, the transmitting apparatus 100 may further include a scrambler (not shown). The scrambler (not shown) may randomize input bits and output randomized bits. In FIG. 14A, such scrambler (not shown) may be disposed between the segmentation unit 410 and the zero padding unit 420. In FIG. 14B, the scrambler (not shown) may be disposed between the segmentation unit 410 and the BCH encoder 430.

Meanwhile, even though the interleaver 470 and the demux 480 described in connection with FIGS. 14A-14B are not illustrated in FIGS. 13A-13B, the transmitting unit 100 may further include an interleaver (not shown) and a demux (not shown) which are disposed between the puncturing unit 460 and the modulator 490 in FIGS. 13A-13B.

Hereinafter, a receiving apparatus which receives and processes a signal transmitted from the transmitting apparatus 100 will be described.

The receiving apparatus 1500 receives a signal from the transmitting apparatus 100 and processes the received signal. In this case, the signal received from the transmitting apparatus 100 may be a signal including an OFDM symbol (e.g., a preamble symbol). Here, the OFDM symbol is generated such that the second data is additionally mapped to cells of the OFDM symbol which remain after the first data and the second data are mapped to cells of the OFDM symbol. Thus, the receiving apparatus 1500 is able to restore or reconstruct the first data and the second data by determining that at least a portion of the second data is additionally mapped to cells of the OFDM symbol which remain after the first data and the second data are mapped to the OFDM symbol.

In this case, the second data may include a plurality of second data blocks, but it is merely an example. The second data may be formed of one second data block.

To be specific, the signal received from the transmitting apparatus 100 may be a signal including an OFDM symbol. Here, the OFDM symbol is generated such that at least a portion of each of the plurality of second data blocks is mapped to cells which remain after the first data and the plurality of second data blocks are mapped to cells in the OFDM symbol. In this case, a length of the at least a portion of each of the second data blocks which is additionally mapped to the remaining cells may be calculated based on the number of the remaining cells and the number of the plurality of second data blocks.

The OFDM symbol may also be generated such that the first data and one of the plurality of second data blocks are mapped to cells in the OFDM symbol, and a portion of the mapped second data block is additionally mapped to cells from a cell next to a last cell to which the second data block is mapped. Further, another of the plurality of second data blocks is mapped to cells from a cell next to a last cell to which the portion of the second data block is mapped and a portion of the other second data block is additionally mapped to cells from a cell next to a last cell to which the other second data block is mapped.

The method of mapping the first data and the second data to an OFDM symbol by the transmitting apparatus 100 is described above in connection with the transmitting apparatus 100.

The receiving apparatus may process the signal received from the transmitting apparatus 100.

To be specific, the receiving apparatus 1500 may reconstruct the first data from the received signal. In addition, the receiving apparatus 1500 may obtain length information on the second data from the reconstructed first data, calculate the number of the second data blocks by using the obtained length information, obtain a rule by which the second data is mapped to cells of the OFDM symbol based on the number of the calculated second data blocks and the number of cells which remain after the first data and the second data are mapped in the OFDM symbol, and reconstruct the second data based on the obtained rule.

For this operation, the receiving apparatus 1500 may include components such as those shown in FIGS. 15 to 17B. Hereinafter, for convenience in explanation, the first data is an L1-pre signaling and the second data is an L1-post signaling.

Figure 15:
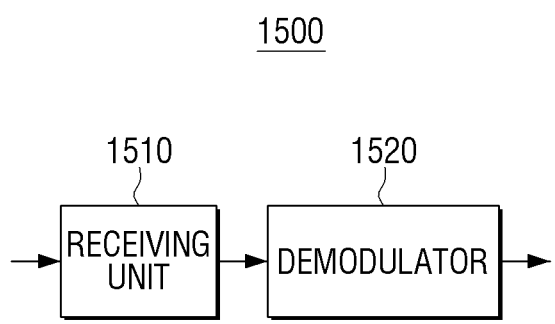
FIGS. 15, 16A, 16B, 17A and 17B are diagrams provided to describe a structure of a receiving apparatus according to exemplary embodiments.

Referring to FIG. 15, the receiving apparatus 1500 includes a receiving unit 1510 and a demodulator 1520.

The receiving unit 1510 receives a signal transmitted from the transmitting apparatus 100. For this operation, the receiving unit 1510 may include an antenna (not shown) and receive a frame including a preamble symbol to which the first data and the second data are mapped through an allocated channel.

In this case, the frame may further include a data symbol in addition to the preamble symbol. That is, the frame may include a data symbol to which other data than the first data and the second data is mapped, and the data symbol may include a plurality of OFDM symbols. For example, in case the first data is the L1-pre signaling and the second data is the L1-post signaling, broadcasting data may be mapped to the data symbol.

The demodulator 1520 demodulates a signal received from the transmitting apparatus 100. To be specific, the demodulator 1520 may generate a value corresponding to an LDPC codeword by demodulating the received signal.

In this case, the value corresponding to the LDPC codeword may be represented as a channel value. Various method of determining a channel value may exist, and for example, the method may be a method of determining a Log Likelihood Ratio (LLR) value.

To be specific, the LLR value may be represented as a value where a Log is applied to a ratio where a bit transmitted from the transmitting apparatus 100 is 0 and a ratio where a bit transmitted from the transmitting apparatus 100 is 1. Alternatively, the LLR value may be a bit value determined according to a hard decision. In addition, the LLR value may be a representative value determined according to a section to which a probability that a bit transmitted from the transmitting apparatus 100 is 0 or 1 belongs.

The transmitting apparatus 100 encodes and modulates each of the L1-pre signaling and the L1-post signaling, map the modulated symbol to cells in the preamble symbol, and transmits the preamble symbol as an OFDM symbol. Thus, the signal received from the receiving apparatus 1500 may include an LDPC codeword generated as the L1-pre signaling is encoded (that is, an L1-pre FEC frame) and an LDPC codeword generated as the L1-post signaling is encoded (that is, an L1-post FEC frame).

Accordingly, the demodulator 1520 may determine the LLR value with respect to each of the L1-pre signaling and the L1-post signaling.

The demodulator 1520 may detect the L1-pre signaling from the OFDM symbol and determine the LLR value with respect to the L1-pre signaling. In this case, a length of the L1-pre signaling and a location of cells where the L1-pre signaling is mapped may be predefined between the transmitting apparatus 100 and the receiving apparatus 1500.

Figure 16A:
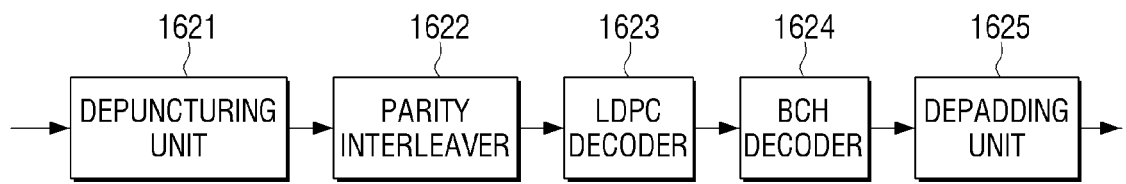
Figure 16B:
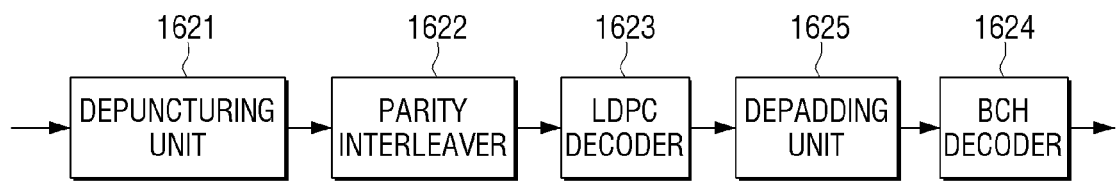

The receiving apparatus 1500 may reconstruct the L1-pre signaling based on the LLR value with respect to the L1-pre signaling, by using the components such as that shown in FIGS. 16A-16B. For this operation, the receiving apparatus 1500 may further include an LLR inserting unit 1621, a parity deinterleaver 1622, an LDPC decoder 1623, a BCH decoder 1624, and a de-padding unit 1625 as shown in FIG. 16A.

The LLR inserting unit 1621 add a certain value to an output value of the demodulator 1520 and output the value to the parity deinterleaver 1622. In this case, the demodulator 1520 may output the LLR value with respect to the L1-pre signaling to the LLR inserting unit 1621.

To be specific, the LLR inserting unit 1621 is a component corresponding to the puncturing unit 350 of the transmitting apparatus 100, and performs an operation corresponding to an operation of the puncturing unit 350. That is, the LLR inserting unit 1621 may add an LLR value corresponding to bits which were punctured and an LLR value corresponding to bits which were shortened, to an LLR value output from the demodulator 1520. In this case, the LLR value corresponding to the punctured bits may be 0, and the LLR value corresponding to the shortened bits may be ∞ or −∞. However, ∞ or −∞ is only a theoretical value, and an actual value may be a maximum value or a minimum value of LLR which is used in the receiving apparatus 1500.

For this operation, the receiving apparatus 1500 may pre-store information on the number and a location of the bits punctured in the transmitting apparatus 100 or may receive the information from the transmitting apparatus 100. In addition, the receiving apparatus 1500 may pre-store information on the number, a location, and a bit value of the bits shortened in the transmitting apparatus 100 or may receive the information from the transmitting apparatus 100.

The parity deinterleaver 1622 performs a parity deinterleaving operation with respect to an output value of the LLR inserting unit 1621 and outputs the value to the LDPC decoder 1623.

To be specific, the parity deinterleaver 1622 is a component corresponding to the parity interleaver 340 of the transmitting apparatus 100, and performs an operation corresponding to an operation of the parity interleaver 340. That is, the parity deinterleaver 1622 may de-interleave an LLR value corresponding to LDPC parity bits among the LLR values output from the LLR inserting unit 1621 by performing an interleaving operation of the parity interleaver 340 inversely.

The LDPC decoder 1623 performs an LDPC decoding operation based on an output value of the parity deinterleaver 1622 and outputs a decoding result value to the BCH decoder 1624.

To be specific, the LDPC decoder 1623 is a component corresponding to the LDPC encoder 330 of the transmitting apparatus 100, and performs an operation corresponding to an operation of the LDPC encoder 330. For example, the LDPC decoder 1623 may correct an error by performing an LDPC decoding using an LLR value output from the parity deinterleaver 1622 based on an iterative decoding on a basis of a sum-product algorithm.

In this case, the sum-product algorithm exchanges messages (for example, LLR values) on a bipartite graph of a message passing algorithm through an edge, and shows an algorithm to be updated by calculating an output message from messages input from variable nodes or test nodes.

The BCH decoder 1624 performs a BCH decoding operation with respect to an output value of the LDPC decoder 1623, and outputs the decoding result value to the de-padding unit 1625.

In this case, the output value of the LDPC decoder 1623 includes L1-pre signaling bits, zero bits which are padded to the L1-pre signaling, and BCH parity bits. Thus, the BCH decoder 1624 may correct an error by using the BCH parity bits and output the L1-presignaling bits and the zero bits padded to the L1-pre signaling to the de-padding unit 1625.

The de-padding unit 1625 may remove the zero bits from the output value of the BCH decoder 1624.

To be specific, the de-padding unit 1625 is a component corresponding to the padding unit 310 of the transmitting apparatus 100 and may perform an operation corresponding to an operation of the padding unit 310. That is, the de-padding unit 1625 may remove the zero bits added by the padding unit 310 from among the bits output from the BCH decoder 1624 and output the L1-pre signaling.

As above, in case the transmitting apparatus 100 processes and transmits the L1-pre signaling by using the components as shown in FIG. 13A, the receiving apparatus 1500 may process the L1-pre signaling by using the components as shown in FIG. 16A.

However, in case the transmitting apparatus 100 uses the components as shown in FIG. 13B, the receiving apparatus 1500 may process the L1-pre signaling by using the components as in FIG. 16B. In this case, an arrangement of components is different from the arrangement as described in FIG. 16A, but operations performed by the components and used parameters are the same. Accordingly, the aforementioned difference will be described below.

The LDPC decoder 1623 may output bits generated by a decoding operation to the de-padding unit 1180. In this case, the bits input to the de-padding unit 1625 may include the L1-pre signaling, zero bits which are padded to the L1-pre signaling, and the BCH parity bits.

The de-padding unit 1625 may remove the zero bits from the bits output from the LDPC decoder 1623 and output the bits, from which the zero bits are removed, to the BCH decoder 1624.

Accordingly, the bits input to the BCH decoder 1624 include the L1-pre signaling and the zero bits which are padded to the L1-pre signaling. In this regard, the BCH decoder 1624 may correct an error by using the BCH parity bits and output the L1-pre signaling.

In case the transmitting apparatus 100 uses a scrambler (not shown), the receiving apparatus 1500 may further include a de-scrambler (not shown) even though it is not illustrated in FIGS. 16A-16B. The descrambler (not shown) may de-randomize input bits and output the de-randomized bits. In FIG. 16A, the descrambler (not shown) which performs such operation may be disposed after the de-padding unit 1625. In FIG. 16B, the descrambler (not shown) may be disposed after the BCH decoder 1624.

By the aforementioned method, the receiving apparatus 1500 may recover the L1-pre signaling from the signal received from the transmitting apparatus 100.

The receiving apparatus 1500 may further include an information obtaining unit (not shown) configured to obtain information on the L1-post signaling from the L1-pre signaling.

For example, the information obtaining unit (not shown) may obtain length information on the L1-post signaling from the L1-pre signaling and calculate the number of L1-post FEC frames based on the obtained length information.

That is, as described above, the L1-post signaling is segmented so as to have bits fewer than a certain number. An L1-post FEC frame generated as each of the segmented L1-post signalings is processed is transmitted to the receiving apparatus 1500. Accordingly, the information obtaining unit (not shown) may calculate the number of the L1-post FEC frames according to the length of the L1-post signaling, based on a segmentation rule which is predefined between the transmitting apparatus 100 and the receiving apparatus 1500.

An information obtaining unit (not shown) may obtain information on a rule by which the L1-post signaling is mapped based on the number of the calculated L1-post FEC frames and the number of cells which remain after the L1-pre signaling and the L1-post signaling are mapped in the OFDM symbol.

For example, the information on the rule by which the L1-post signaling is mapped may be determined based on a quotient and a remainder obtained by dividing the number of cells, which remain after the L1-pre signaling and a plurality of L1-post FEC frames are mapped in the OFDM symbol, by the number of the L1-post FEC frames. In addition, the information on the rule where the L1-post signaling is mapped may include information on a length and the number of the L1-post FEC frames which are additionally mapped to the remaining cells. This mapping operation is described above in detail in connection with the transmitting apparatus 100.

Meanwhile, the demodulator 1520 may determine the LLR value with respect to the L1-post signaling in the OFDM symbol, based on the information on the rule by which the second data is mapped.

In particular, as described above, the transmitting apparatus 100 additionally maps the L1-post signaling to the remaining cells in the preamble symbol and transmits. Accordingly, the demodulator 1520 may determine the LLR value with respect to the L1-post signaling by adding the LLR value determined with respect to the L1-post signaling and the LLR value determined with respect to the additionally mapped L1-post signaling.

For example, it is assumed that the L1-post signaling includes a first L1-post FEC frame and a second L1-post FEC frame.

In this case, the demodulator 1520 may determine an LLR value with respect to the first L1-post FEC frame by determining an LLR value with respect to bits constituting each of modulation symbols included in the first L1-post FEC frame, determining an LLR value with respect to bits constituting each of modulation symbols included in the additionally mapped first L1-post FEC frame, and adding the LLR values.

In addition, the demodulator 1520 may determine an LLR value with respect to the second L1-post FEC frame by determining an LLR value with respect to bits constituting each of modulation symbols included in the second L1-post FEC frame, determining an LLR value with respect to bits constituting each of modulation symbols included in the additionally mapped second L1-post FEC frame, and adding the LLR values.

As above, in determining an LLR value with respect to an L1-post signaling, an LLR value with respect to the additionally mapped L1-post signaling is added. Accordingly, the reliability with respect to the bits constituting the modulation symbol may be enhanced.

Figure 17A:
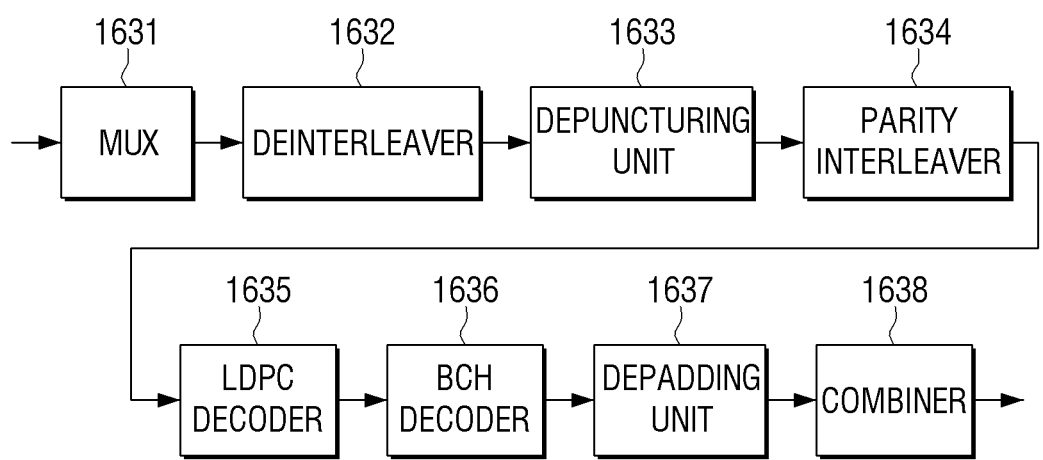
Figure 17B:
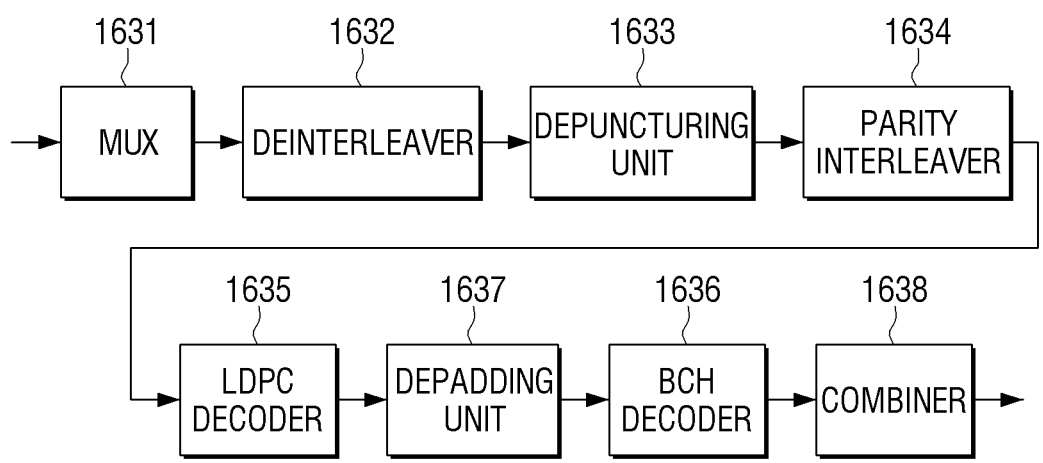

Meanwhile, the receiving apparatus 1500 may reconstruct the L1-post signaling based on the LLR value with respect to the L1-post signaling, by using components such as that shown in FIGS. 17A-17B. For this operation, as shown in FIG. 17A, the receiving apparatus 1500 may further include a mux 1631, a deinterleaver 1632, an LLR inserting unit 1633, a parity deinterleaver 1634, an LDPC decoder 1635, a BCH decoder 1636, a de-padding unit 1637, and a combiner 1638.

The mux (or, multiplexer) 1631 multiplexes an output value of the demodulator 1520 and output a multiplexed value to the deinterleaver 1632. In this case, the demodulator 1520 may output an LLR value with respect to the L1-post signaling to the mux 1631.

To be specific, the mux 1631 is a component corresponding to the demux 480 of the transmitting apparatus 100 and may perform an operation corresponding to an operation of the demux 480. That is, the mux 1631 may output an LLR value in a bit unit by cell-to-bit converting an output value of the demodulator 1520.

The deinterleaver 1632 may deinterleave an output value of the mux 1631 and output the deinterleaved output value to LLR inserting unit 1633.

To be specific, the deinterleaver 1632 is a component corresponding to the interleaver 470 of the transmitting apparatus 100 and may perform an operation corresponding to an operation of the interleaver 470. That is, the deinterleaver 1632 may deinterleave the output value of the mux 1631 by performing an interleaving operation performed by the interleaver 470 inversely.

The LLR inserting unit 1633 add a certain value to an output value of the deinterleaver 1632 and output a resultant value to the parity deinterleaver 1634.

To be specific, the LLR inserting unit 1633 is a component corresponding to the puncturing unit of the transmitting apparatus 100 and perform an operation corresponding to an operation of the puncturing unit 460. That is, the LLR inserting unit 1633 may add an LLR value corresponding to the punctured parity bits and an LLR value corresponding to the shortened bits to an LLR value output from the deinterleaver 1632. In this case, the LLR value corresponding to the punctured bits may be 0, and the LLR value corresponding to the shortened bits may be $\infty$ or $-\infty$. However, $\infty$ or $-\infty$ is only a theoretical value, and an actual value may be a maximum value or a minimum value of LLR which is used in the receiving apparatus 1500.

For the above operation, the receiving apparatus 1500 may pre-store information on the number and a location of the bits punctured in the transmitting apparatus 100 or receive the information from the transmitting apparatus 100. In addition, the receiving apparatus 1500 may pre-store information on the number, a location, and a bit value of the bits shortened in the transmitting apparatus 100 or receive the information from the transmitting apparatus 100.

The parity deinterleaver 1634 performs a parity deinterleaving operation with respect to an output value of the LLR inserting unit 1633 and output the value to the LDPC decoder 1635.

To be specific, the parity deinterleaver 1634 is a component corresponding to the parity interleaver 450 of the transmitting apparatus 200 and performs an operation corresponding to an operation of the parity interleaver 450. That is, the parity deinterleaver 1634 may perform the interleaving operation performed by the parity interleaver 450 inversely and deinterleave the LLR value corresponding to the LDPC parity bits among the LLR values output from the depuncturing unit 1633.

The LDPC decoder 1635 perform an LDPC encoding operation based on an output value of the parity deinterleaver 1634 and outputs the encoding result value to the BCH decoder 1636.

To be specific, the LDPC decoder 1635 is a component corresponding to the LDPC encoder 440 of the transmitting apparatus 100 and performs an operation corresponding to an operation of the LDPC encoder 440. For example, the LDPC decoder 1635 may correct an error by performing an LDPC decoding using an LLR value output from the parity deinterleaver 1634 based on an iterative decoding on a basis of a sum-product algorithm The BCH decoder 1636 performs a BCH decoding operation with respect to an output value of the LDPC decoder 1635 and outputs the decoding result value to the depadding unit 1637.

In this case, the output value of the LDPC decoder 1635 includes the segmented L1-post signaling bits, the zero bits which are padded to the segmented L1-post signaling, and the BCH parity bits. In this regard, the BCH decoder 1635 may correct an error by using the BCH parity bits and output the segmented L1-post signaling bits and the zero bits which are padded to the segmented L1-post signaling bits to the depadding unit 1637.

The depadding unit 1637 may remove the zero bits from the output value of the BCH decoder 1636 and output the bits to the combiner 1638.

To be specific, the depadding unit 1637 is a component corresponding to the padding unit 420 of the transmitting apparatus 100 and may perform an operation corresponding to an operation of the padding unit 420. That is, the depadding unit 1637 may remove the zero bits added by the padding unit 420 from among the bits output from the BCH decoder 1637 and output the segmented L1-post signaling.

The LLR value with respect to the L1-post signaling corresponds to the segmented L1-post signaling. Accordingly, the aforementioned component may perform a processing operation with respect to the LLR value with respect to the L1-post signaling multiple times (that is, by the number of the segmented L1-post signaling). Accordingly, a plurality of L1-post signaling bit strings output from the depadding unit 1637 may be a plurality of segmented L1-post signalings.

Accordingly, the combiner 1638 may perform a desegmentation operation with respect to the output value of the depadding unit 1637.

To be specific, the combiner 1638 is a component corresponding to the segmentation unit 410 of the transmitting apparatus 100 and may perform an operation corresponding to an operation of the segmentation unit 410. That is, the combiner 1638 may desegment the segmented L1-post signalings and output the L1-post signaling before being segmented.

In case the transmitting apparatus 100 processes and transmits the L1-post signaling by using the components as shown in FIG. 14A, the transmitting apparatus 1500 may process the L1-pre signaling by using the components as shown in FIG. 17A.

However, in case the transmitting apparatus 100 uses the components as shown in FIG. 14B, the receiving apparatus 1500 may process the L1-post signaling by using the components as shown in FIG. 17B. In this case, an arrangement of components is different from the arrangement as described in FIG. 17A, but operations performed by the components and used parameters are the same. Accordingly, the aforementioned difference will be described below.

The LDPC decoder 1635 may output bits generated by a decoding operation to the depadding unit 1637. In this case, the bits input to the depadding unit 1637 may include the segmented L1-post signaling, zero bits which are padded to the segmented L1-post signaling, and the BCH parity bits.

The deppading unit 1637 may remove the zero bits from the bits output from the LDPC decoder 1635 and output the bits, from which the zero bits are removed, to the BCH decoder 1636.

Accordingly, the bits input to the BCH decoder 1636 includes the segmented L1-post signaling and the zero bits which are padded to the segmented L1-post signaling. In this regard, the BCH decoder 1636 may correct an error by using the BCH parity bits and output the segmented L1-post signaling.

If the transmitting apparatus 100 includes a scrambler (not shown), even though it is not illustrated in FIG. 17, the receiving apparatus 1500 may further include a descramber (not shown). The descramber (not shown) may de-randomize input bits and output the de-randomized inputted bits. In FIG. 17A, such descramber (not shown) may be disposed between the depadding unit 1637 and the combiner 1638. In FIG. 17B, the descramber (not shown) may be disposed between the BCH decoder 1636 and the combiner 1638.

By the aforementioned method, the receiving apparatus 1500 may reconstruct the L1-post signaling from the signal received from the transmitting apparatus 100.

Although FIGS. 16A-16B and FIGS. 17A-17B illustrate that the L1-pre signaling and the L1-post signaling are processed separately, this is merely an example. According to another exemplary embodiment, the components indicated by a same term may process both of the two signalings. For example, the LDPC decoder 1623 for LDPC decoding of the L1-pre signaling illustrated in FIGS. 16A-16B may also be used for LDPC decoding of the L1-post signaling.

By the aforementioned method, the receiving apparatus 1500 may recover the L1-post signaling from the signal received from the transmitting apparatus 100.

Figure 18:
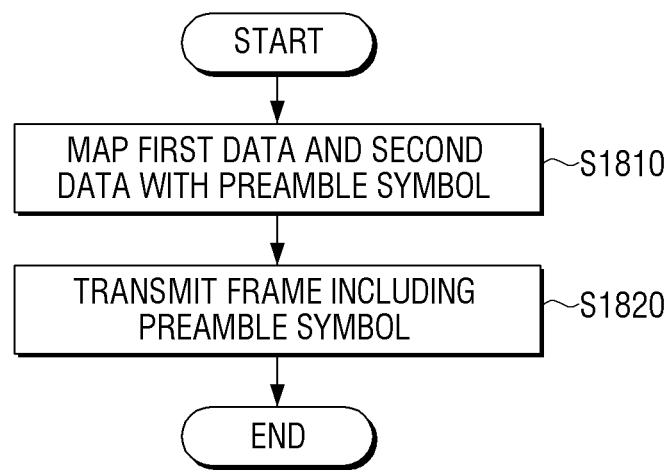
FIG. 18 is a flow chart provided to describe a method of mapping an L1 signaling of a transmitting apparatus according to an exemplary embodiment.

FIG. 18 is a flow chart provided to describe a method of mapping data of a transmitting apparatus, according to an exemplary embodiment.

First data and second data are mapped to an OFDM symbol which is a preamble symbol or a data symbol (S1810).

In addition, a frame including the preamble symbol or the data symbol is transmitted (S1820).

Specifically, in S1810, the second data may be additionally mapped to the cells which remain after the first data and the second data are mapped in the OFDM symbol. In this case, the second data may include a plurality of second data blocks.

To be specific, in S1810, the first data and the second data may be mapped to the cells in the OFDM symbol, and at least a portion of each of a plurality of second data blocks may be additionally mapped to remaining cells in the preamble symbol based on a length of the at least a portion of the second data blocks calculated based on the number of the remaining cells and the number of the plurality of second data blocks.

In addition, in S1810, the first data and one of the plurality of second data blocks may be mapped to cells in the OFDM symbol, and a portion of the mapped second data block may be additionally mapped to cells from a cell next to a last cell to which the second data block is mapped. Further, in this preamble symbol, another block among the plurality of second data blocks may be mapped to cells from a cell next to a last cell to which the portion of the second data block is mapped, and a portion of the other second data block may be additionally mapped to cells from a cell next to a last cell to which the other second data block is mapped.

Meanwhile, the method of mapping the first data and the second data is described above in connection with the transmitting apparatus 100.

Figure 19:
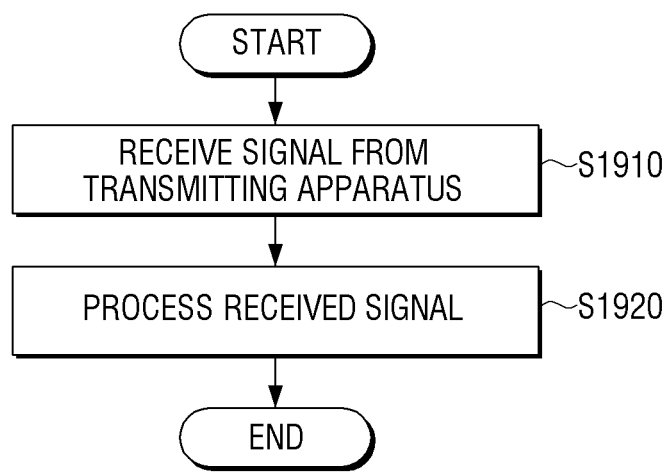
FIG. 19 is a flow chart provided to describe a signal processing method of a receiving apparatus according to an exemplary embodiment.

FIG. 19 is a flow chart provided to describe a signal processing method of a receiving apparatus according to an exemplary embodiment.

A signal is received from the transmitting apparatus 100 (S1910).

Subsequently, the received signal is processed (S1920).

In this case, the signal received from the transmitting apparatus may be a signal including an OFDM symbol. The OFDM symbol is generated such that the first data and the second data are mapped to the OFDM symbol which is a preamble symbol or a data symbol, and at least a portion of the second data is additionally mapped to cells which remain after the first data and the second data are mapped to the OFDM symbol. In this case, the second data may include a plurality of second data blocks.

To be specific, the OFDM symbol is generated such that the first data and the plurality of second data blocks are mapped to the cells in the OFDM symbol, and at least a portion of each of the plurality of second data blocks is additionally mapped to the remaining cells. In this case, a length of the additionally mapped portion of each of second data blocks may be calculated based on the number of the remaining cells and the number of the plurality of second data blocks.

The OFDM symbol may also be generated such that the first data and one of the plurality of second data blocks are mapped to cells in the OFDM symbol, and at least a portion of the mapped second data block is additionally mapped from a next cell. Further, another block of the plurality of second data blocks is mapped from a next cell, and at least a portion of the other mapped second data block is additionally mapped from a next cell.

Meanwhile, the method of mapping the first data and the second data is described above in connection with the transmitting apparatus 100.

The receiving apparatus 1500 which receives and processes the signal is also described above.

According to an exemplary embodiment, a non-transitory computer readable medium which includes a program for performing the method of mapping data and the data processing method may be provided.

The non-transitory computer readable medium refers to a medium which may store data semi-permanently rather than storing data for a short time such as a register, a cache, and a memory and may be readable by an apparatus. Specifically, the above-described various applications and programs may be stored in the non-transitory computer readable medium like a compact disc (CD), a digital versatile disk (DVD), a hard disk, a Blu-ray disk, a universal serial bus (USB), a memory card, and a read-only memory (ROM), etc., and provided therein.

The above block diagrams illustrating a transmitting apparatus and a receiving apparatus do not include a bus. However, in the transmitting apparatus and the receiving apparatus, communication between the components thereof may be performed through the bus. In addition, each component in the above apparatuses may further include a processor which performs the aforementioned various operations, such as a central processing unit (CPU), a microprocessor, etc.

Although various exemplary embodiments have been shown and described, the inventive concept is not limited to the aforementioned exemplary embodiments, and could be variously modified and achieved by those skilled in the art to which the inventive concept pertains without deviating from the substance of the inventive concept which is claimed in the claims, and such modifications should not be understood separately from the inventive concept.

What is claimed is:

1. A method of mapping data to an Orthogonal Frequency Division Multiplexing (OFDM) symbol, the method comprising:
   segmenting second data and mapping first data and a plurality of the segmented second data to an OFDM symbol; and
   transmitting a frame including the OFDM symbol,
   wherein the mapping comprises additionally mapping at least a portion of each of the plurality of the segmented second data to cells of the OFDM symbol which remain after the first data and the plurality of the segmented second data are mapped to the OFDM symbol.

2. The method as claimed in claim 1, wherein the plurality of the segmented second data comprises a plurality of second data blocks.

3. The method as claimed in claim 2, wherein the mapping comprises:
   mapping the first data and the second data blocks to the OFDM symbol;
   calculating a length of the at least a portion of each of the second data blocks which is to be additionally mapped based on a number of the remaining cells and a number of the second data blocks; and
   additionally mapping the at least a portion of each of the second data blocks to the remaining cells, based on the calculated length.

4. The method as claimed in claim 2, wherein the mapping comprises:
   mapping the first data and a block of the second data blocks to cells of the OFDM symbol; and
   additionally mapping at least a portion of the block to cells from a cell next to a last cell to which the block is mapped.

5. The method as claimed in claim 4, wherein the mapping further comprises:
   mapping another block among the second data blocks to cells from a cell next to a last cell to which the at least a portion of the block is mapped; and
   additionally mapping at least a portion of the other block to cells from a cell next to a last cell to which the other block is mapped.

6. The method as claimed in claim 1, wherein the mapping determines the number of symbol of the segmented second data mapped additionally to the remained cells, based on the number of the remained cells and the number of the segmented second data.

7. The method as claimed in claim 1, wherein the mapping maps the same number of symbols from each of the segmented second data to the remained cells, when the number of the remained cells is multiple of the number of the segmented second data.

8. The method as claimed in claim 1, wherein the number of symbols mapped additionally from at least plurality of the segmented second data to the remained cells is larger than the number of symbols mapped additionally from the remaining segmented second data to the remained cells, when the number of the remained cells is not multiple of the number of the segmented second data.

9. A transmitting apparatus comprising:
   a frame mapper configured to segment second data and map first data and a plurality of the segmented second data to an Orthogonal Frequency Division Multiplexing (OFDM) symbol; and
   a transmitter configured to transmit a frame including the OFDM symbol,
   wherein the frame mapper is further configured to additionally map at least a portion of each of the plurality of the segmented second data to cells of the OFDM symbol which remain after the first data and the plurality of the segmented second data are mapped to the OFDM symbol.

10. The transmitting apparatus as claimed in claim 9, wherein the plurality of the segmented second data comprises a plurality of second data blocks.

11. The transmitting apparatus as claimed in claim 10, wherein the frame mapper is further configured to map the first data and the second data blocks to the OFDM symbol, calculate a length of the at least a portion of each of the second data blocks which is to be additionally mapped based on a number of the remaining cells and a number of the second data blocks, and additionally map the at least a portion of each of the second data blocks to the remaining cells, based on the calculated length.

12. The transmitting apparatus as claimed in claim 10, wherein the frame mapper is further configured to map the first data and a block among the second data blocks to cells of the OFDM symbol, and additionally map at least a portion of the block to cells from a cell next to a last cell to which the block is mapped.

13. The transmitting apparatus as claimed in claim 12, wherein the frame mapper is further configured to map another block among the second data blocks to cells from a cell next to a last cell to which the at least a portion of the block is mapped, and additionally map at least a portion of the other block to cells from a cell next to a last cell to which the other block is mapped.

14. A data processing method of a receiving apparatus, the method comprising:
   receiving a signal from a transmitting apparatus; and
   processing the received signal to restore first data and a plurality of segmented second data included in the signal,
   wherein the processing comprises determining that at least a portion of each of the plurality of the segmented second data is additionally mapped to cells of an Orthogonal Frequency Division Multiplexing (OFDM) symbol which remain after the first data and the plurality of the segmented second data are mapped to the OFDM symbol.

15. The data processing method as claimed in claim 14, wherein the plurality of the segmented second data comprises a plurality of second data blocks.

16. The data processing method as claimed in claim 15, wherein the processing further comprises determining that the first data and the plurality of second data blocks are mapped to cells of the OFDM symbol, and the at least a portion of each of the second data blocks is additionally mapped to the remaining cells, based on a length of the additionally mapped portion of each of the second data blocks which is calculated based on a number of the remaining cells and a number of the second data blocks.

17. The data processing method as claimed in claim 15, wherein the processing further comprises determining that the first data and a block among the second data blocks are mapped to cells of the OFDM symbol, and at least a portion of the block is additionally mapped to cells from a cell next to a last cell to which the block is mapped.

18. The data processing method as claimed in claim 17, wherein the processing further comprises determining that another block among the second data blocks is mapped to cells from a cell next to a last cell to which the at least a portion of the block is mapped, and at least a portion of the other block is additionally mapped to cells from a cell next to a last cell to which the other block is mapped.

19. A receiving apparatus receiving a signal from a transmitting apparatus and processing the received signal, wherein the receiving apparatus is configured to restore first data and a plurality of segmented second data included in the signal by determining that at least a portion of each of the plurality of the segmented second data is additionally mapped to cells of an Orthogonal Frequency Division Multiplexing (OFDM) symbol which remain after the first data and the plurality of the segmented second data are mapped to the OFDM symbol.

20. The receiving apparatus as claimed in claim 19, wherein the plurality of the segmented second data comprises a plurality of second data blocks.

21. The receiving apparatus as claimed in claim 20, wherein the receiving apparatus further determines that the first data and the plurality of second data blocks are mapped to cells of the OFDM symbol, and the at least a portion of each of the second data blocks is additionally mapped to the remaining cells, based on a length of the additionally mapped portion of each of the second data blocks which is calculated based on a number of the remaining cells and a number of the second data blocks.

22. The receiving apparatus as claimed in claim 20, wherein the receiving apparatus further determines that the first data and a block among the second data blocks are mapped to cells of the OFDM symbol, and at least a portion of the block is additionally mapped to cells from a cell next to a last cell to which the block is mapped.

23. The receiving apparatus as claimed in claim 22, wherein the receiving apparatus further determines that another block among the second data blocks is mapped to cells from a cell next to a last cell to which the at least a portion of the block is mapped, and at least a portion of the other block is additionally mapped to cells from a cell next to a last cell to which the other block is mapped.

* * * * *